United States Patent
Kanzaki

(10) Patent No.: US 11,561,380 B2
(45) Date of Patent: *Jan. 24, 2023

(54) WIDE-ANGLE LENS CAPABLE OF SUPPRESSING MULTIPLE REFLECTION BETWEEN THE SECOND LENS AND THE THIRD LENS

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 281 days.

This patent is subject to a terminal disclaimer.

(21) Appl. No.: 16/955,781

(22) PCT Filed: Dec. 19, 2018

(86) PCT No.: PCT/JP2018/046709
§ 371 (c)(1),
(2) Date: Jun. 19, 2020

(87) PCT Pub. No.: WO2019/131368
PCT Pub. Date: Jul. 4, 2019

(65) Prior Publication Data
US 2020/0341244 A1  Oct. 29, 2020

(30) Foreign Application Priority Data

Dec. 26, 2017 (JP) .............................. JP2017-248893

(51) Int. Cl.
*G02B 13/06* (2006.01)
*G02B 1/11* (2015.01)
(Continued)

(52) U.S. Cl.
CPC ................ *G02B 13/06* (2013.01); *G02B 1/11* (2013.01); *G02B 9/62* (2013.01); *G02B 13/0045* (2013.01); *G02B 27/0025* (2013.01)

(58) Field of Classification Search
None
See application file for complete search history.

(56) References Cited

U.S. PATENT DOCUMENTS 7,595,938 B2   9/2009   Yamakawa et al.
7,667,901 B2   2/2010   Baba
(Continued)

FOREIGN PATENT DOCUMENTS

CN   101038365   9/2007
CN   101149465   3/2008
(Continued)

OTHER PUBLICATIONS

Darryl Meister, "High-Powered Lenses and Thickness," https://web.archive.org/web/20160308214806/http://www.opticampus.com/popcourse.php?url=high_powered/ (Year: 2016).*
(Continued)

*Primary Examiner* — Edemio Navas, Jr.
(74) *Attorney, Agent, or Firm* — JCIPRNET

(57) ABSTRACT

A wide-angle lens (100) includes a front group (110), an aperture (80), and a rear group (120). The front group (110) includes a first lens (10), a second lens (20), and a third lens (30) arranged in order from a side (La) closest to an object to an image side (Lb). In such a wide-angle lens, to suppress an occurrence of a ghost caused by multiple reflection between a lens surface (22) of the second lens (20) on the image side (Lb) and a lens surface (31) of the third lens (30) on the object side (La), the sag amount Sag31 (mm) and the
(Continued)

diameter D31 (mm) of the lens surface (31) satisfy the following conditional expression: $0<|Sag31|/(D31/2)<0.125$.

10 Claims, 13 Drawing Sheets

(51) Int. Cl.
  *G02B 13/00* (2006.01)
  *G02B 27/00* (2006.01)
  *G02B 9/62* (2006.01)

(56) References Cited

U.S. PATENT DOCUMENTS

| | | | |
|---|---|---|---|
| 8,134,787 | B2 | 3/2012 | Saitoh |
| 9,261,670 | B2 | 2/2016 | Lai et al. |
| 2015/0062720 | A1 | 3/2015 | Lai et al. |
| 2015/0277088 | A1 | 10/2015 | Chang |
| 2017/0090071 | A1* | 3/2017 | Fukaya ............ G02B 1/115 |
| 2017/0293111 | A1* | 10/2017 | Ikegaya ............ G02B 9/62 |

FOREIGN PATENT DOCUMENTS

| | | | |
|---|---|---|---|
| CN | 201438236 | | 4/2010 |
| CN | 101796449 | | 8/2010 |
| CN | 203630431 | | 6/2014 |
| CN | 104423022 | | 3/2015 |
| JP | 2007249073 | | 9/2007 |
| JP | 2008076716 | | 4/2008 |
| JP | 2009092798 | | 4/2009 |
| JP | 2013073156 | | 4/2013 |
| JP | 2013073156 A | * | 4/2013 ............ G02B 13/04 |
| JP | 2016057562 | | 4/2016 |
| JP | 2017191160 | | 10/2017 |
| JP | 2017223755 | | 12/2017 |
| WO | 2009031324 | | 3/2009 |
| WO | 2015159592 | | 10/2015 |

OTHER PUBLICATIONS

Office Action of China Counterpart Application, with English translation thereof, dated Jul. 21, 2021, pp. 1-15.
"International Search Report (Form PCT/ISA/210) of PCT/JP2018/046709," dated Apr. 2, 2019, with English translation thereof, pp. 1-6.

* cited by examiner

WIDE-ANGLE LENS CAPABLE OF SUPPRESSING MULTIPLE REFLECTION BETWEEN THE SECOND LENS AND THE THIRD LENS

CROSS-REFERENCE TO RELATED APPLICATION

This application is a 371 application of the international PCT application serial no. PCT/JP2018/046709, filed on Dec. 19, 2018, which claims the priority benefit of Japan application no. 2017-248893, filed on Dec. 26, 2017. The entirety of each of the above-mentioned patent applications is hereby incorporated by reference herein and made a part of this specification.

TECHNICAL FIELD

The present invention relates to a wide-angle lens used in various types of image pickup systems.

BACKGROUND ART

In wide-angle lenses, a lens configuration of six elements in five groups has been proposed to achieve high resolution (see Patent Literature 1). In the wide-angle lens described in Patent Literature 1, a front group, an aperture, and a rear group are arranged in order from an object side to an image side, and in the front group, at least a first lens, a second lens, and a third lens are arranged in order from a side closest to an object to the image side.

The first lens is a negative meniscus lens of which a lens surface on the image side is a concave curved surface. The second lens is a negative meniscus lens of which a lens surface on the image side is a concave curved surface. The third lens has a concave curved lens surface on the object side.

CITATION LIST

Patent Literature

[Patent Literature 1]: Japanese Patent Laid-Open Publication No. 2016-57562

SUMMARY OF THE INVENTION

Problems to be Solved by the Invention

In the wide-angle lens described in Patent Literature 1 and the like, the concave lens surface of the second lens on the image side and the concave lens surface of the third lens on the object side face each other between the second lens and the third lens. Thus, if multiple reflection occurs between the lens surface of the first lens and the lens surface of the second lens on the object side, there is a problem that a spot-like ghost easily occurs due to such multiple reflection.

In view of the above problem, an object of the present invention is to provide a wide-angle lens capable of suppressing an occurrence of a ghost caused by multiple reflection between the lens surface of the second lens on the image side and the lens surface of the third lens on the object side.

Means for Solving the Problem

To solve the above-described problem, a wide-angle lens according to the present invention includes a front group, an aperture, and a rear group arranged in order from an object side to an image side. In the front group, at least a first lens, a second lens, and a third lens are arranged in order from a side closest to an object to the image side, the first lens is a negative meniscus lens of which a lens surface on the image side is a concave curved surface, the second lens is a negative lens of which a lens surface on the image side is a concave curved surface, the third lens is a positive lens of which a lens surface on the image side is a convex curved surface, and when a sag amount of a lens surface of the third lens on the object side is assumed to be Sag31 (mm), and a diameter of the lens surface of the third lens on the object side is assumed to be D31 (mm), the sag amount Sag31 and the diameter D31 satisfy the following conditional expression.

$$0<|Sag31/(D31/2)|<0.125$$

In the present invention, an absolute value of a ratio (Sag31/(D31/2)) of the sag amount Sag31 of the lens surface of the third lens on the object side to a radius (D31/2) of the lens surface of the third lens on the object side exceeds the lower limit (0) because of which the lens surface of the third lens on the object side is not flat. Therefore, it is possible to properly correct various aberrations. An upper limit (0.125) is set to the absolute value of the ratio (Sag31/(D31/2)) because of which it is possible to avoid concave surfaces having a large sag amount from facing to each other between the second lens and the third lens. Therefore, multiple reflection between the concave surfaces having a large sag amount can be suppressed between the second lens and the third lens, and as a result, it is possible to suppress an occurrence of a spot-like ghost due to multiple reflection between the lens surface of the second lens on the image side and the lens surface of the third lens on the object side.

In the present invention, it is possible to employ an aspect in which, when a sag amount of the lens surface of the second lens on the image side is assumed to be Sag22 (mm), and a diameter of the lens surface of the second lens on the image side is assumed to be D22 (mm), the sag amount Sag22 and the diameter D22 satisfy the following conditional expression.

$$0.400<Sag22/(D22/2)<1.733$$

In such an aspect, a lower limit (0.400) is set to a ratio (Sag22/(D22/2)) of the sag amount Sag22 of the lens surface of the second lens on the image side to the radius (D22/2) of the lens surface of the second lens on the image side, and thus, it is possible to secure a sufficient negative power. Therefore, it is possible to properly correct various aberrations. An upper limit (1.733) is set to the ratio (Sag22/(D22/2)), and thus, it is possible to prevent an angle formed between a peripheral portion of the lens surface of the second lens on the image side and a tangent from being excessively small. The second lens is easily manufactured, and thus, it is possible to reduce the cost.

In the present invention, it is possible to employ an aspect in which, when a sag amount of a lens surface of the second lens on the object side is assumed to be Sag21 (mm), and a diameter of the lens surface of the second lens on the object side is assumed to be D21 (mm), the sag amount Sag21 and the diameter D21 satisfy the following conditional expression.

$$0<|Sag21/(D21/2)|<0.125$$

In such an aspect, the absolute value of the ratio (Sag21/(D21/2)) of the sag amount Sag21 of the lens surface of the second lens on the object side to the radius (D21/2) of the lens surface of the second lens on the object side exceeds the lower limit (0) because of which the lens surface of the second lens on the object side is not flat. Therefore, it is possible to properly correct various aberrations. An upper limit (0.125) is set to the absolute value of the ratio (Sag21/(D21/2)) because of which it is possible to avoid a concave surface having a large sag amount and a convex surface having a large sag amount from facing to each other between the first lens and the second lens. Thus, it is possible to suppress multiple reflection between the lens surface of the first lens on the image side and the lens surface of the second lens on the object side. As a result, it is possible to suppress a ring-shaped ghost from occurring due to multiple reflection between the lens surface of the first lens on the image side and the lens surface of the second lens on the object side.

In the present invention, it is possible to employ an aspect in which an anti-reflection layer is provided on at least the lens surface of the first lens on the image side. According to such an aspect, it is possible to suppress multiple reflection between the lens surface of the first lens on the image side and the lens surface of the second lens on the object side.

In this case, it is possible to employ an aspect in which an anti-reflection layer having a reflectance of 1.5% or less in a wavelength range from 430 nm to 850 nm is provided on the lens surface of the first lens on the image side as the anti-reflection layer. That is, the anti-reflection layer having a reflectance of 1.5% or less in a wide wavelength range up to a near infrared range, in addition to a normal visible range, is provided on the lens surface of the first lens on the image side. Thus, even if an angle formed between a tangent to a peripheral portion of the lens surface and an optical axis is small, and a thickness of a film forming the anti-reflection layer is smaller than an appropriate value in the peripheral portion when the anti-reflection layer is provided on the lens surface of the first lens on the image side, the anti-reflection layer appropriately prevents reflection of light in a long wavelength range. Therefore, it is possible to suppress an occurrence of a ring-shaped red ghost.

In the present invention, it is possible to employ an aspect in which, when a sag amount of the lens surface of the first lens on the image side is assumed to be Sag12 (mm), and a diameter of the lens surface of the first lens on the image side is assumed to be D12 (mm), the sag amount Sag12 and the diameter D12 satisfy the following conditional expression.

$$0.577 < Sag12/(D12/2) < 1.733$$

In such an aspect, a lower limit (0.577) is set to a ratio (Sag12/(D12/2)) of the sag amount Sag12 of the lens surface of the first lens on the image side to a radius (D12/2) of the lens surface of the first lens on the image side, and thus, it is possible to secure a sufficient negative power. Therefore, it is possible to appropriately correct various aberrations even if the field angle is widened. An upper limit (1.733) is set to the ratio (Sag12/(D12/2)), and thus, it is possible to prevent the angle formed between the peripheral portion of the lens surface of the first lens on the image side and the tangent from being excessively small. Therefore, it is possible to prevent the thickness of the film forming the anti-reflection layer from being small in the peripheral portion when the anti-reflection layer is provided on the lens surface of the first lens on the image side. Further, the first lens is easily manufactured, and thus, it is possible to reduce the cost.

In the present invention, it is possible to employ an aspect in which the front group includes the first lens, the second lens, and the third lens arranged in order from the object side to the image side, the rear group includes a fourth lens, a fifth lens, and a sixth lens arranged in order from the object side to the image side, the third lens is a positive lens of which a lens surface on the image side is a convex curved surface, the fourth lens is a positive lens of which a lens surface on the image side is a convex curved surface, the fifth lens is a negative lens of which a lens surface on the image side is a concave curved surface, the sixth lens is a biconvex lens of which a lens surface on the object side and a lens surface on the image side are convex curved surfaces, the second lens, the third lens, the fifth lens, and the sixth lens are plastic lenses, the fourth lens is a glass lens, and the fifth lens and the sixth lens form a cemented lens in which the lens surface of the fifth lens on the image side and the lens surface of the sixth lens on the object side are cemented. According to such an aspect, the concave surface of the fifth lens on the image side and the convex surface of the sixth lens on the object side are cemented on the image side with respect to the aperture, because of which it is possible to appropriately correct a chromatic aberration. The second lens, the third lens, the fifth lens, and the sixth lens are plastic lenses, and therefore, it is possible to achieve cost reduction. In this case, the fourth lens is also a glass lens, and thus, the change in the refractive index due to the temperature change is small. Therefore, it is possible to improve the temperature characteristics of the wide-angle lens. As a result, it is possible to achieve a higher resolution over a wide temperature range.

MODE FOR CARRYING OUT THE INVENTION

Figure 1:
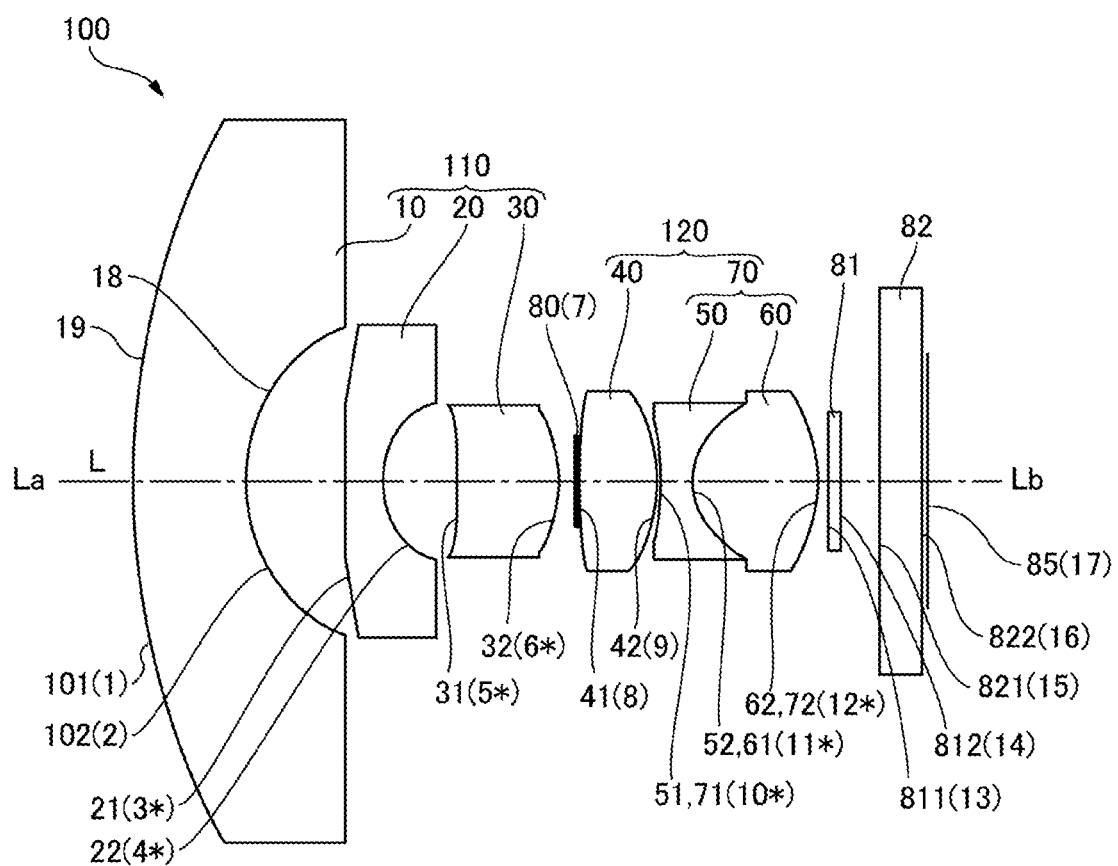
FIG. 1 is an explanatory diagram of a wide-angle lens according to a first embodiment of the present invention.

An embodiment of the present invention will be described with reference to the drawings. In the drawings referenced below, an object side in a direction in which an optical axis L extends is denoted by La, and an image side is denoted by Lb. In the present invention, a "diameter of a lens surface" is the optical effective diameter on the lens surface. The effective diameter is a diameter of a circle formed of outermost points in the radial direction (points farthest from the optical axis), out of points where all light rays contributing to an image formation intersect the lens surface. A "Sag amount (Sag)" is, if a virtual plane perpendicular to an optical axis is assumed to be a virtual reference surface, a distance from a point on an optical axis L of a virtual reference surface on an outermost circumference of the effective diameter of the lens surface to a point on an optical axis L of the lens surface. If the sag amount is a positive value, the point on the optical axis L of the virtual reference surface is located closer to the object side than the point on the optical axis L of the lens surface, and if the sag amount is a negative value, the point on the optical axis L of the virtual reference surface is located closer to the image side than the point on the optical axis L of the lens surface.

First Embodiment

FIG. 1 is an explanatory diagram of a wide-angle lens 100 according to a first embodiment of the present invention. In a surface number in FIG. 1, "*" is assigned to an aspherical surface. As illustrated in FIG. 1, the wide-angle lens 100 according to the present embodiment includes a front group 110, an aperture 80, a rear group 120, and an infrared cut filter 81 arranged in order from an object side La to an image side Lb. The front group 110 includes a first lens 10, a second lens 20, and a third lens 30 arranged from the side La closest to an object to the image side Lb. The rear group 120 includes a fourth lens 40, a fifth lens 50, and a sixth lens 60 arranged from the object side La to the image side Lb. The flat plate-shaped infrared cut filter 81, a light transmitting cover 82, and an image pickup element 85 are arranged in order on the image side Lb of the sixth lens 60.

The first lens 10 is a negative meniscus lens (a meniscus lens having a negative power) of which a lens surface 102 (a second surface 2) on the image side Lb is a concave curved surface, and a lens surface 101 (a first surface 1) on the object side La is a convex curved surface. The second lens 20 is a negative lens (a lens having a negative power) of which a lens surface 22 (a fourth surface 4) on the image side Lb is a concave curved surface, and a lens surface 21 (a third surface 3) on the object side La is a concave curved surface. The third lens 30 is a positive lens (a lens having a positive power), of which a lens surface 32 (a sixth surface 6) on the image side Lb is a convex curved surface, and in the present embodiment, a lens surface 31 (a fifth surface 5) of the third lens 30 on the object side La is a concave curved surface. The fourth lens 40 is a positive lens (a lens having a positive power), of which a lens surface 42 (a ninth surface 9) on the image side Lb is a convex curved surface, and in the present embodiment, a lens surface 41 (an eighth surface 8) of the fourth lens 40 on the object side La is a convex curved surface. The fifth lens 50 is a negative lens (a lens having a negative power), of which a lens surface 52 (an eleventh surface 11) on the image side Lb is a concave curved surface, and in the present embodiment, a lens surface 51 (a tenth surface 10) of the fifth lens 50 on the object side La is a concave curved surface. The sixth lens 60 is a biconvex lens, of which a lens surface 61 on the object side La and a lens surface 62 on the image side Lb (a twelfth surface 12) are convex curved surfaces, and has a positive power. The fifth lens 50 and the sixth lens 60 configure a cemented lens 70 in which the lens surface 52 of the fifth lens 50 on the image side Lb and the lens surface 61 of the sixth lens 60 on the object side La are cemented by an adhesive (not illustrated), and the lens surface 52 of the fifth lens 50 on the image side Lb and the lens surface 61 of the sixth lens 60 on the object side La configure the eleventh surface 11. According to the embodiment, the fifth lens 50 and the sixth lens 60 configure the cemented lens 70 on the image side Lb with respect to the aperture 80, and thus, it is possible to appropriately correct a chromatic aberration. The adhesive is preferably a material having elasticity even after curing.

The aperture 80 configures a seventh surface 7. A surface 811 of the infrared cut filter 81 on the object side La configures a thirteenth surface 13, and a surface 812 of the infrared cut filter 81 on the image side Lb configures a fourteenth surface 14. A surface 821 of the cover 82 on the object side La configures a fifteenth surface 15, and a surface 822 of the cover 82 on the image side Lb configures a sixteenth surface 16. The imaging surface of the image pickup element 85 configures a seventeenth surface 17.

The second lens 20, the third lens 30, the fifth lens 50, and the sixth lens 60 are plastic lenses made of acrylic resins, polycarbonates, polyolefins, or the like. Therefore, it is possible to achieve cost reduction. Even in this case, the first lens 10 and the fourth lens 40 are glass lenses. The fourth lens 40 adjacent to the aperture 80 is a glass lens, and the change in the refractive index due to the temperature change is small. Therefore, it is possible to improve the temperature characteristics of the wide-angle lens 100. As a result, it is possible to achieve a higher resolution over a wide temperature range. Further, the first lens 10 arranged at the side La closest to the object is a glass lens, and therefore, the first lens 10 is not easily scratched. In the present embodiment, the lens surfaces 21 and 22 of the second lens 20, the lens surfaces 31 and 32 of the third lens 30, the lens surfaces 51 and 52 of the fifth lens 50, and the lens surfaces 61 and 62 of the sixth lens 60 are aspherical. The lens surfaces 101 and 102 of the first lens 10 and the lens surfaces 41 and 42 of the fourth lens 40 are spherical.

(Lens Configuration)

A configuration and the like of each of the lenses included in the wide-angle lens 100 according to the present embodiment are as shown in Table 1, and in Table 1, the following characteristics are shown as characteristics of the wide-angle lens 100.

Focal length f0 of the entire lens system (Effective Focal Length)
Total length d0 (Total Track)
F value of the entire lens system (Image Space)
Maximum field angle (Max. Field Angle)

Further, in Table 1, the following items of each of the surfaces are listed. The unit of the curvature radius, thickness, and focal length is mm. Here, if the lens surface is a convex surface protruding toward the object side or a concave surface recessed toward the object side, the radius of curvature is set to a positive value, and if the lens surface is a convex surface protruding toward the image side or a concave surface recessed toward the image side, the radius of curvature is set to a negative value.

Radius of curvature (Radius)
Thickness
Refractive index Nd
Abbe number vd
Focal length f Table 1 shows aspherical coefficients A4, A6, A8, A10 . . . obtained when the shape of the aspherical surface is represented by the following expression (Math. 1). In the following expression, z denotes a sag amount (axis in an optical axis direction), r denotes a height (rays height) in a direction perpendicular to the optical axis, k denotes a conical coefficient, and c denotes a reciprocal of the radius of curvature.

$$Z = \frac{cr^2}{1+\sqrt{1-(1+K)c^2r^2}} + \sum_{n=2}^{5} A_{2n} r^{2n} \qquad [\text{Math. 1}]$$

value of the entire lens system is 2.0, and a maximum field angle is 215 deg.

(Aberration Characteristics of Wide-Angle Lens 100)

Figure 2:
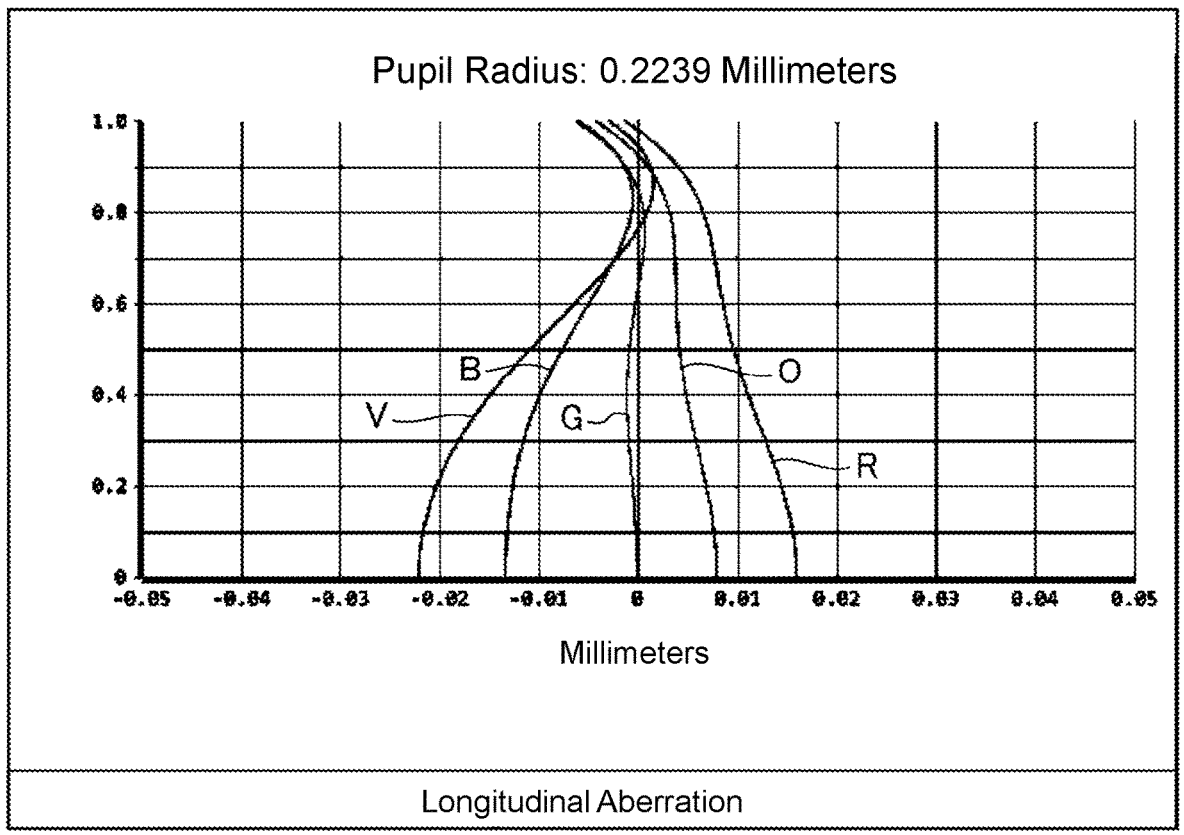
FIG. 2 is a graphical representation for explaining a spherical aberration of the wide-angle lens illustrated in FIG. 1.
Figure 3:
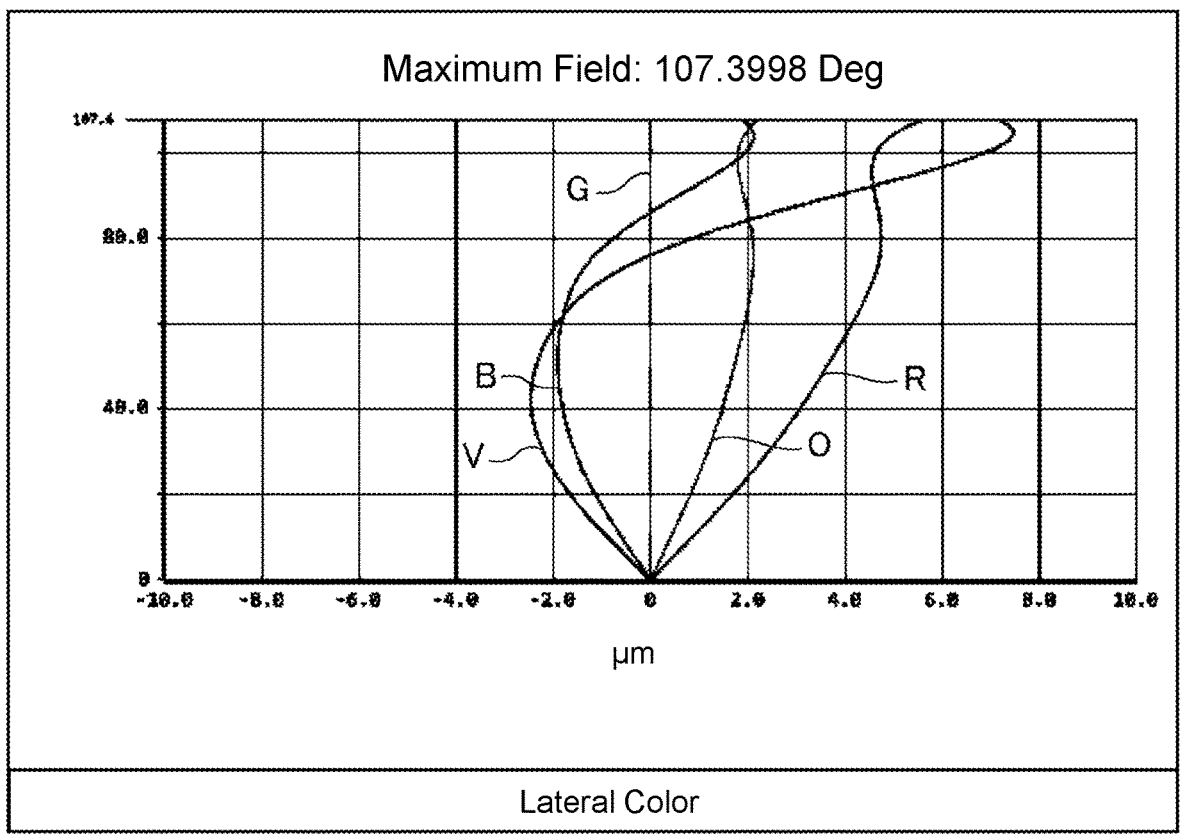
FIG. 3 is a graphical representation for explaining a chromatic aberration of magnification of the wide-angle lens illustrated in FIG. 1.
Figure 4:
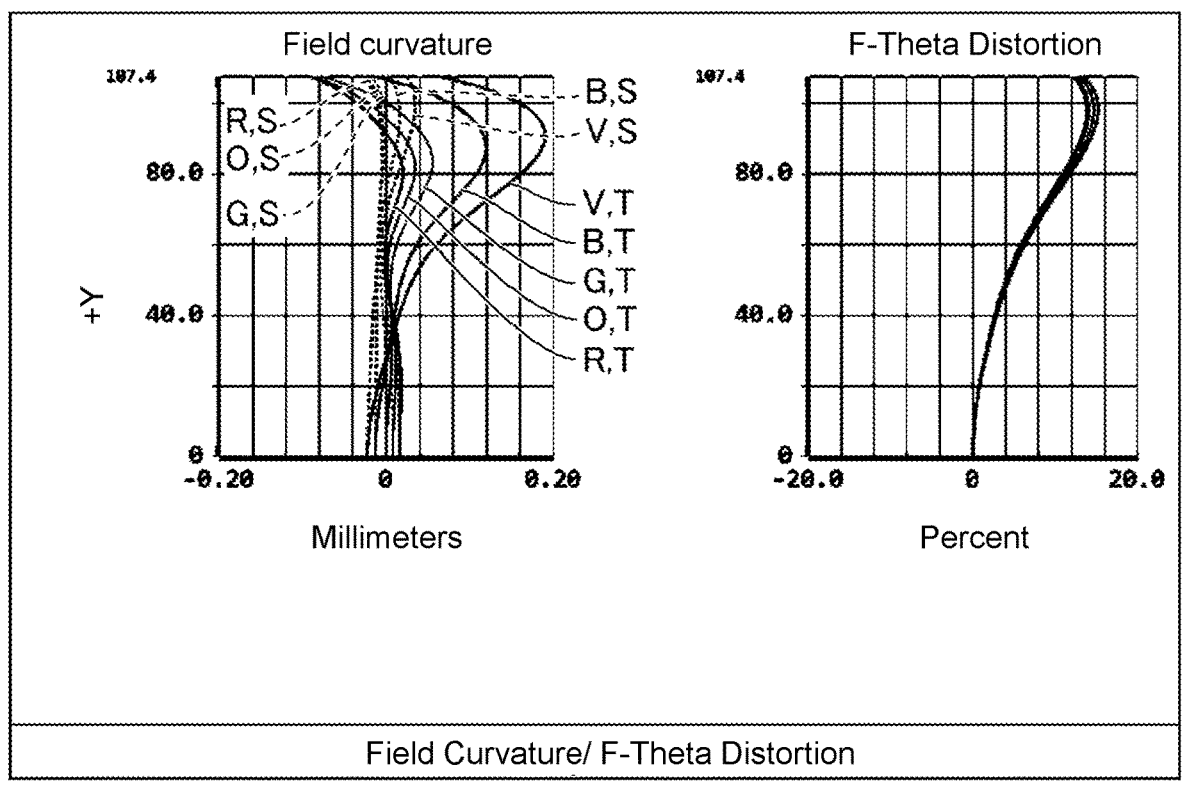
FIG. 4 is a graphical representation for explaining an astigmatism and a distortion of the wide-angle lens illustrated in FIG. 1.

FIG. 2 is a graphical representation for explaining a spherical aberration of the wide-angle lens 100 illustrated in FIG. 1. FIG. 3 is a graphical representation for explaining a chromatic aberration of magnification of the wide-angle lens 100 illustrated in FIG. 1, and shows the chromatic aberration of magnification at the maximum field angle (107.3998 deg/half). FIG. 4 is a graphical representation for explaining an astigmatism and a distortion of the wide-angle lens 100 illustrated in FIG. 1.

FIG. 2, FIG. 3, and FIG. 4 show aberrations at wavelengths of 435 nm, 473 nm, 546 nm, 600 nm, and 668 nm with V, B, G, O, and R added respectively. As for the astigmatism shown in FIG. 4, S indicates a characteristic in a sagittal direction and T indicates a characteristic in a tangential direction. The distortion shown in FIG. 4 indicates a change ratio between a captured image at the center portion and the captured image at the peripheral portion, and

TABLE 1

| Effective Focal Length f0 | | | | | | 0.914 mm | | | | |
|---|---|---|---|---|---|---|---|---|---|---|
| Total Track d0 | | | | | | 12.302 mm | | | | |
| Image Space F/# | | | | | | 2.0 | | | | |
| Max. Field of Angle | | | | | | 215 deg | | | | |

| Surf | Radius | Thickness | Nd | v d | Diameter | Sag | f | f | f | f |
|---|---|---|---|---|---|---|---|---|---|---|
| 1 | 12.080 | 1.730 | 1.876 | 40.5 | 11.215 | 1.380 | −4.197 | −1.283 | 5.968 | |
| 2 | 2.630 | 1.538 | | | 4.793 | 1.547 | | | | |
| 3* | −17.806 | 0.600 | 1.546 | 56.2 | 4.793 | 0.199 | −2.588 | | | |
| 4* | 1.534 | 1.147 | | | 2.495 | 0.837 | | | | |
| 5* | −17.529 | 1.580 | 1.641 | 23.9 | 2.354 | −0.097 | 3.288 | | | 2440 |
| 6* | −1.948 | 0.230 | | | 2.164 | −0.302 | | | | |
| 7(stop) | Infinity | 0.060 | | | | | | | | |
| 8 | 6.890 | 1.240 | 1.700 | 55.3 | 2.800 | 0.144 | 2.708 | | 3.456 | |
| 9 | −2.420 | 0.064 | | | 2.800 | −0.446 | | | | |
| 10* | −3.775 | 0.500 | 1.641 | 23.9 | 1.964 | −0.123 | −1.476 | 15.769 | | |
| 11* | 1.329 | 1.912 | 1.488 | 56.2 | 2.434 | 0.834 | 2.006 | | | |
| 12* | −1.962 | 0.050 | | | 2.783 | −0.388 | | | | |
| 13 | Infinity | 0.880 | | | | | | | | |
| 14 | Infinity | 0.700 | | | | | | | | |
| 15 | Infinity | 0.070 | | | | | | | | |
| 16 | Infinity | 0.001 | | | | | | | | |
| 17 | Infinity | 0.000 | | | | | | | | |

| Surf | c (1/Radius) | K | A4 | A6 | A8 |
|---|---|---|---|---|---|
| 3 | −5.61610E−02 | 0.00000E+00 | 3.60936E−02 | −5.99090E−03 | 2.21927E−04 |
| 4 | 6.51738E−01 | −4.66402E−01 | 5.00065E−02 | 6.04932E−02 | −3.50474E−02 |
| 5 | −5.70487E−02 | 0.00000E+00 | −3.53407E−02 | 2.08968E−02 | −1.44401E−02 |
| 6 | −5.13307E−01 | 0.00000E+00 | 2.09869E−02 | 3.19045E−03 | −1.01598E−02 |
| 10 | −2.64927E−01 | 0.00000E+00 | 7.66279E−02 | −1.53653E−01 | 1.41002E−01 |
| 11 | 7.52638E−01 | 4.76358E−02 | 6.24629E−01 | −9.08358E−01 | 5.68710E−01 |
| 12 | −5.09809E−01 | −1.20630E+00 | 2.28623E−02 | −3.26880E−02 | 3.86973E−02 |

| Surf | A10 | A12 | A14 | A16 |
|---|---|---|---|---|
| 3 | 3.66687E−05 | −4.60173E−06 | 0.00000E+00 | 0.00000E+00 |
| 4 | 3.14135E−02 | −1.09696E−02 | 0.00000E+00 | 0.00000E+00 |
| 5 | −7.06547E−04 | 1.64926E−03 | 0.00000E+00 | 0.00000E+00 |
| 6 | 5.85313E−03 | −4.48093E−04 | 0.00000E+00 | 0.00000E+00 |
| 10 | −7.70197E−02 | 1.91731E−02 | 0.00000E+00 | 0.00000E+00 |
| 11 | −1.66042E−01 | 3.29393E−03 | 0.00000E+00 | 0.00000E+00 |
| 12 | −1.89499E−02 | 4.11829E−03 | 0.00000E+00 | 0.00000E+00 |

As shown in Table 1, in the wide-angle lens 100 according to the present embodiment, a focal length f0 of the entire lens system is 0.914 mm, a total length being the distance from the lens surface 101 of the first lens 10 on the object side La to the image pickup element 85 is 12.302 mm, an F it can be said that the smaller the absolute value of the value representing the distortion, the higher the precision of the lens.

As shown in FIG. 2 through FIG. 4, in the wide-angle lens 100 according to the present embodiment, the spherical aberration, the chromatic aberration of magnification, and the astigmatism (distortion) are corrected to an appropriate level.

(Configuration for Ghost Measures, Etc.)

Table 2 shows numerical values corresponding to the conditional expressions described below, and FIG. 2 also shows numerical values in a modification of the first embodiment, and second and third embodiments described later. The values shown in Table 2 have been rounded to the nearest whole number.

TABLE 2

| Conditional Expression | | First Embodiment | Modification of First Embodiment | Second Embodiment | Third Embodiment |
|---|---|---|---|---|---|
| (1) | $0.577 < \text{Sag}12/(D12/2) < 1.733$ | 0.646 | 0.648 | 0.645 | 0.595 |
| (2) | $0 < |\text{Sag}21/(D21/2)| < 0.125$ | 0.083 | 0.083 | 0.060 | 0.051 |
| (3) | $0 < |\text{Sag}31/(D31/2)| < 0.125$ | 0.082 | 0.083 | 0.090 | 0.092 |
| (4) | $0.400 < \text{Sag}22/(D22/2) < 1.733$ | 0.671 | 0.674 | 0.718 | 0.464 |
| (5) | $0.1 < |f12/f3456| < 1$ | 0.526 | 0.544 | 0.567 | 0.556 |
| (6) | $0.5 < |f12/f0| < 2.5$ | 1.40 | 1.405 | 1.53 | 1.40 |
| (7) | $2 < f456/f0 < 4$ | 3.78 | 3.316 | 3.16 | 3.00 |
| (8) | $10 < d0/f0 < 18$ | 13.46 | 13.463 | 13.64 | 13.12 |
| (9) | $1.7 < n1$ | 1.876 | 1.876 | 1.876 | 1.876 |

As shown in Table 1 and Table 2, when the sag amount of the lens surface 102 of the first lens 10 is assumed to be Sag12 (mm), and the diameter of the lens surface 102 of the first lens 10 is assumed to be D12 (mm), the sag amount Sag12 and the diameter D12 satisfy the following conditional expression (1).

$$0.577 < \text{Sag}12/(D12/2) < 1.733 \quad \text{Conditional expression (1)}$$

More specifically, Sag12 is 1.547 mm and D12 is 4.793 mm. Therefore, the ratio (Sag12/(D12/2)) is 0.646, which satisfies the conditional expression (1).

The ratio (Sag12/(D12/2)) exceeds the lower limit (0.577), because of which it is possible to secure a sufficient negative power. Also, it is possible to appropriately correct various aberrations even if the field angle is widened. An upper limit (1.733) is set to the ratio (Sag12/(D12/2)), and thus, it is possible to prevent the angle formed between the peripheral portion of the lens surface 102 of the first lens 10 and the tangent from being excessively small. Therefore, it is possible to prevent a thickness of a film forming the anti-reflection layer from being small in the peripheral portion when the anti-reflection layer described later is provided on the lens surface 102 of the first lens 10. Further, the first lens 10 is easily manufactured, and thus, it is possible to reduce the cost.

When the sag amount of the lens surface 21 of the second lens 20 is assumed to be Sag21 (mm), and the diameter of the lens surface 21 of the second lens 20 is assumed to be D21 (mm), the sag amount Sag21 and the diameter D21 satisfy the following conditional expression (2).

$$0 < |\text{Sag}21/(D21/2)| < 0.125 \quad \text{Conditional expression (2)}$$

More specifically, Sag21 is 0.199 mm and D21 is 4.793 mm. Therefore, the absolute value of the ratio (Sag21/(D21/2)) is 0.083, which satisfies the conditional expression (2).

The absolute value of the ratio (Sag21/(D21/2)) exceeds the lower limit (0), and therefore, the lens surface 21 of the second lens 20 is not flat. Therefore, it is possible to properly correct various aberrations. An upper limit (0.125) is set to the absolute value of the ratio (Sag21/(D21/2)) because of which it is possible to avoid a concave surface having a large sag amount and a convex surface having a large sag amount from facing to each other between the first lens 10 and the second lens 20. Thus, it is possible to suppress multiple reflection between the lens surface 102 of the first lens 10 and the lens surface 21 of the second lens 20. As a result, an occurrence of a ring-shaped ghost caused by multiple reflection between the lens surface 102 of the first lens 10 and the lens surface 21 of the second lens 20 can be suppressed. It is also possible to avoid concave surfaces having a large sag amount from facing to each other between the lens surface 102 of the first lens 10 and the lens surface 21 of the second lens 20. Therefore, an occurrence of a spot-like ghost caused by multiple reflections between the concave surfaces having a large sag amount can also be suppressed.

When the sag amount of the lens surface 31 of the third lens 30 is assumed to be Sag31 (mm), and the diameter of the lens surface 31 of the third lens 30 is assumed to be D31 (mm), the sag amount Sag31 and the diameter D31 satisfy the following conditional expression (3).

$$0 < |\text{Sag}31/(D31/2)| < 0.125 \quad \text{Conditional expression (3)}$$

More specifically, the sag amount Sag31 is −0.097 mm and D21 is 2.354 mm. Therefore, the absolute value of the ratio (Sag31/(D31/2)) is 0.082, which satisfies the conditional expression (3).

The absolute value of the ratio (Sag31/(D31/2)) exceeds the lower limit (0), and therefore, the lens surface 31 of the third lens 30 is not flat. Therefore, it is possible to properly correct various aberrations. An upper limit (0.125) is set to the absolute value of the ratio (Sag31/(D31/2)) because of which it is possible to avoid concave surfaces having a large sag amount from facing to each other between the second lens 20 and the third lens 30. Therefore, multiple reflection between the concave surfaces having a large sag amount can be suppressed between the second lens 20 and the third lens 30, and as a result, it is possible to suppress an occurrence of a spot-like ghost due to multiple reflection between the concave surfaces having a large sag amount, between the lens surface 22 of the second lens 20 and the lens surface 31 of the third lens 30.

When the sag amount of the lens surface 22 of the second lens 20 is assumed to be Sag22 (mm), and the diameter of the lens surface 22 of the second lens 20 is assumed to be D22 (mm), the sag amount Sag22 and the diameter D22 satisfy the following conditional expression (4).

$$0.400 < \text{Sag}22/(D22/2) < 1.733 \quad \text{Conditional expression (4)}$$

More specifically, the sag amount Sag22 is 0.837 mm, and the diameter D22 is 2.495 mm. Therefore, the ratio (Sag22/(D22/2)) is 0.671, which satisfies the conditional expression (4).

The ratio (Sag22/(D22/2)) exceeds the lower limit (0.400), because of which it is possible to secure a sufficient negative power. Therefore, it is possible to properly correct various aberrations. An upper limit (1.733) is set to the ratio (Sag22/(D22/2)), and thus, it is possible to prevent the angle formed between the peripheral portion of the lens surface 22 of the second lens 20 and the tangent from being excessively small. The second lens 20 is easily manufactured, and thus, it is possible to reduce the cost.

When the composite focal length of the first lens 10 and the second lens 20 is assumed to be f12 (mm) and the composite focal length of the third lens 30, the fourth lens 40, the fifth lens 50, and the sixth lens 60 is assumed to be f3456 (mm), the composite focal lengths f12 and f3456 satisfy the following conditional expression (5).

$$0.1 < |f12/f3456| < 1 \quad \text{Conditional expression (5)}$$

More specifically, the composite focal lengths f12 and f3456 are −1.283 mm and 2.440 mm, respectively. Therefore, the absolute value of the ratio f12/f3456 is 0.526, which satisfies the condition (5).

The absolute value of the ratio (f12/f3456) is less than the upper limit (1), because of which it is possible to prevent the positive power from being too strong. Therefore, it is possible to appropriately correct a comatic aberration and an astigmatism. The absolute value of the ratio (f12/f3456) exceeds the lower limit (0.1), because of which it is possible to prevent the negative power from being too strong. Therefore, it is possible to avoid an increase in the total length of the entire lens system. As a result, it is possible to reduce the size of the wide-angle lens 100.

The composite focal length f12 and the focal length f0 of the entire lens system satisfy the following conditional expression (6).

$$0.5 < |f12/f0| < 2.5 \quad \text{Conditional expression (6)}$$

More specifically, the composite focal length f12, and the focal length f0 of the entire lens system are −1.283 mm and 0.914 mm, respectively. Therefore, the absolute value of the ratio f12/f0 is 1.40, which satisfies the conditional expression (6).

The absolute value of the ratio (f12/f0) exceeds the lower limit (0.5), because of which it is possible to suppress the field curvature. Also, the absolute value of the ratio (f12/f0) is less than the upper limit (2.5), because of which the angle of view can be increased.

When the composite focal length of the fourth lens 40, the fifth lens 50, and the sixth lens 60 is assumed to be f456 (mm), the composite focal length f456 and the focal length f0 of the entire lens system satisfy the following conditional expression (7).

$$2 < f456/f0 < 4 \quad \text{Conditional expression (7)}$$

More specifically, the composite focal length f456, and the focal length f0 of the entire lens system are 3.456 mm and 0.914 mm, respectively. Therefore, the ratio f456/f0 is 3.78, which satisfies the conditional expression (7).

The ratio (f456/f0) exceeds the lower limit (2), because of which it is possible to prevent the power of the rear group 120 including the fourth lens 40, the fifth lens 50, and the sixth lens 60 from being too strong. Therefore, it is possible to suitably correct aberrations, particularly chromatic aberrations, and to achieve a higher optical performance. Further, the ratio (f456/f0) is less than the upper limit (4), and thus, it is possible to suppress an excessive increase in the lens diameter, and to avoid the total length of the entire lens system from being too long. As a result, it is possible to reduce the size of the wide-angle lens.

The total length d0 and the focal length f0 of the entire lens system satisfy the following conditional expression (8).

$$10 < d0/f0 < 18 \quad \text{Conditional expression (8)}$$

More specifically, the total length d0, and the focal length f0 of the entire lens system are 12.302 mm and 0.914 mm, respectively. Therefore, d0/f0 is 13.46, which satisfies the conditional expression (8).

The ratio (d0/f0) exceeds the lower limit (10), because of which it is possible to appropriately correct a spherical aberration and a distortion aberration. Further, the ratio (d0/f0) is less than the upper limit (18), and thus, it is possible to suppress an excessive increase in the lens diameter, and to avoid the total length of the entire lens system from being too long. As a result, it is possible to reduce the size of the wide-angle lens.

When the refractive index Nd of the first lens 10 is assumed to be n1, the refractive index n1 of the first lens 10 satisfies the following conditional expression (9).

$$1.7 < n1 \quad \text{Conditional expression (9)}$$

More specifically, the refractive index n1 of the first lens 10 is 1.876. Thus, the conditional expression (9) is satisfied.

The refractive index n1 of the first lens 10 exceeds 1.7, and therefore, it is possible to reduce the outer diameter of the first lens 10. As a result, it is possible to reduce the size of the wide-angle lens 100. In addition, the sag amount of the lens surface 21 of the second lens 20 can be reduced (made shallower), because of which it is possible to suppress multiple reflection between the lens surface 102 of the first lens 10 and the lens surface 21 of the second lens 20. As a result, an occurrence of a ring-shaped ghost caused by multiple reflection between the lens surface 102 of the first lens 10 and the lens surface 21 of the second lens 20 can be suppressed.

(Configuration of Anti-reflection Layer)

Figure 5:
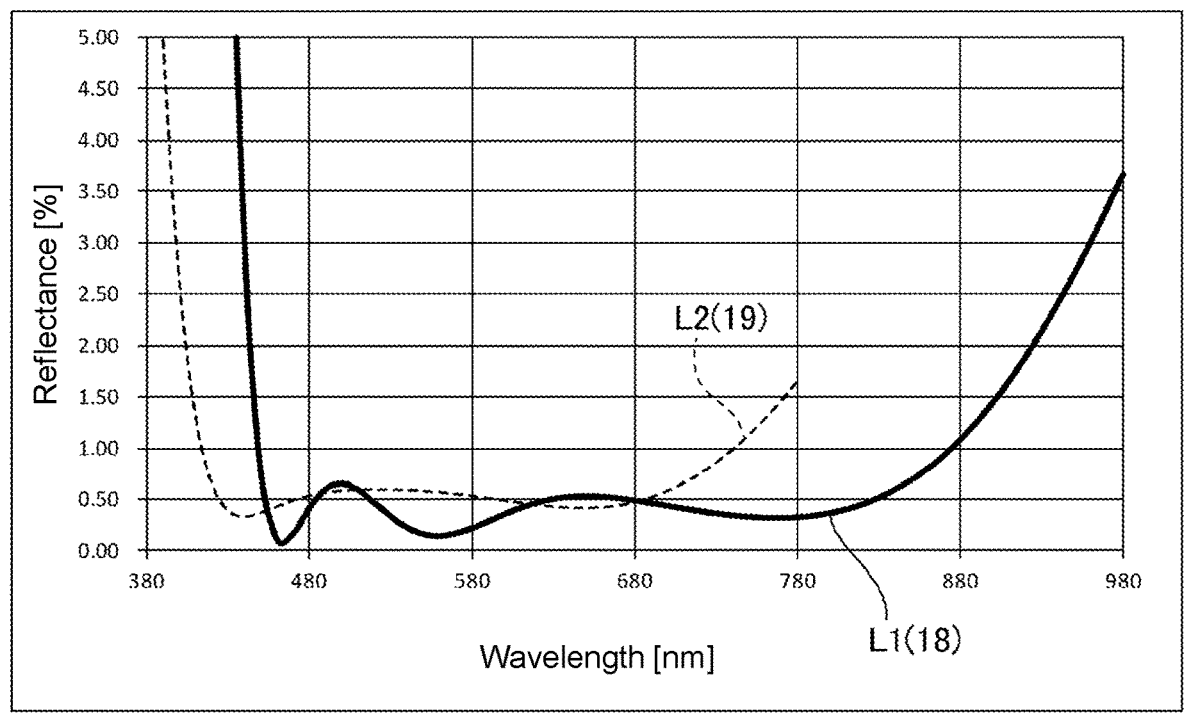
FIG. 5 is a graphical representation for explaining a reflectance characteristic of an anti-reflection layer provided on a lens surface of the first lens, illustrated in FIG. 1, on an image side.

FIG. 5 is a graphical representation for explaining a reflectance characteristic of an anti-reflection layer provided on the lens surface 102 of the first lens 10 on the image side Lb illustrated in FIG. 1. In the present embodiment, an anti-reflection layer 19 is formed on at least the lens surface 102 of the first lens 10 on the image side Lb, and the anti-reflection layer 19 has the reflectance characteristic indicated by the dotted line L2 in FIG. 5. Therefore, multiple reflection between the lens surface 102 of the first lens 10 and the lens surface 21 of the second lens 20 can be suppressed, and thus, it is possible to suppress an occurrence of a ring-shaped ghost caused by multiple reflection.

Here, it is preferable to provide an anti-reflection layer 18 having a reflectance characteristic indicated by a solid line L1 in FIG. 5 on the lens surface 102 of the first lens 10 on the image side Lb instead of the anti-reflection layer 19. The anti-reflection layer 18 has a reflectance of 1.5% or less in a wavelength range from 430 nm to 850 nm. The anti-reflection layer 18 is made of a dielectric multilayer film. The anti-reflection layer 19 is made either of a dielectric multilayer film or a single coating layer.

As seen from FIG. 5, the anti-reflection layer 18 has a reflectance of 1.5% or less in a wide wavelength range up to a near infrared range in addition to a normal visible range. Thus, even if the angle formed between the tangent to the peripheral portion of the lens surface 102 and the optical axis L is small, and the thickness of a film forming the anti-reflection layer 18 is smaller than an appropriate value in the peripheral portion of the lens surface 102, the anti-reflection layer 18 appropriately prevents reflection of light in a long wavelength range. Therefore, multiple reflection between the lens surface 102 of the first lens 10 and the lens surface 21 of the second lens 20 can be suppressed, and thus, it is possible to suppress an occurrence of a ring-shaped ghost. In comparison between the anti-reflection layers 18 and 19, the anti-reflection layer 19 has a larger number of dielectric layers than a general anti-reflection layer. Therefore, it is more cost effective to form the anti-reflection layer 18 only on the lens surface 102 of the first lens 10 and to form the anti-reflection layer 19 on another lens surface such as the lens surface 101 of the first lens 10.

Modification of First Embodiment

In a modification of the first embodiment, the basic configuration of the wide-angle lens 100 is substantially the same as that of the first embodiment illustrated in FIG. 1. Therefore, the lens configuration according to the present modification will be described based on FIG. 1 referenced in the first embodiment.

As illustrated in FIG. 1, similarly to the first embodiment, the wide-angle lens 100 according to the present embodiment also includes the front group 110, the aperture 80, the rear group 120, and the infrared cut filter 81 arranged in order from the object side La to the image side Lb. The front group 110 includes the first lens 10, the second lens 20, and the third lens 30 arranged from the side La closest to the object to the image side Lb. The rear group 120 includes the fourth lens 40, the fifth lens 50, and the sixth lens 60 arranged from the object side La to the image side Lb. The flat plate-shaped infrared cut filter 81, the light transmitting cover 82, and the image pickup element 85 are arranged in order on the image side Lb of the sixth lens 60.

A configuration, etc. of each of the lenses of the wide-angle lens 100 according to the present embodiment are as shown in Table 3. In the wide-angle lens 100 according to the present embodiment, the focal length f0 of the entire lens system is 0.914 mm, the total length being the distance from the lens surface 101 of the first lens 10 to the image pickup element 85 is 12.301 mm, the F value of the entire lens system is 2.0, and the maximum field angle is 215 deg. In the wide-angle lens 100 according to the present embodiment, the spherical aberration, the chromatic aberration of magnification, and the astigmatism (distortion) are similar to those in FIG. 2 through FIG. 4 referenced in the first embodiment, and are corrected to an appropriate level.

TABLE 3

| Effective Focal Length f0 | 0.914 mm |
| Total Track d0 | 12.301 mm |
| Image Space F/# | 2.0 |
| Max. Field of Angle | 215 deg |

| Surf | Radius | Thickness | Nd | v d | Diameter | Sag | f | f | f | f |
|---|---|---|---|---|---|---|---|---|---|---|
| 1 | 12.080 | 1.730 | 1.876 | 40.5 | 11.276 | 1.396 | −4.197 | −1.283 | 5.968 | |
| 2 | 2.630 | 1.538 | | | 4.801 | 1.555 | | | | |
| 3* | −17.806 | 0.600 | 1.546 | 56.2 | 4.801 | 0.199 | −2.588 | | | |
| 4* | 1.534 | 1.147 | | | 2.501 | 0.842 | | | | |
| 5* | −17.529 | 1.580 | 1.641 | 23.9 | 2.362 | −0.098 | 3.288 | | | 2.360 |
| 6* | −1.948 | 0.230 | | | 2.174 | −0.360 | | | | |
| 7(stop) | Infinity | 0.060 | | | | | | | | |
| 8 | 6.890 | 1.240 | 1.700 | 55.3 | 2.800 | 0.144 | 2.708 | | 3.029 | |
| 9 | −2.420 | 0.064 | | | 2.800 | −0.446 | | | | |
| 10* | −3.77462 | 0.500 | 1.641 | 23.9 | 1.967 | −0.124 | −1.340 | 7.963 | | |
| 11* | 1.17 | 1.912 | 1.546 | 56.2 | 2.441 | 0.915 | 1.711 | | | |
| 12* | −1.962 | 0.050 | | | 2.791 | −0.388 | | | | |
| 13 | Infinity | 0.880 | | | | | | | | |
| 14 | Infinity | 0.700 | | | | | | | | |
| 15 | Infinity | 0.070 | | | | | | | | |
| 16 | Infinity | 0.000 | | | | | | | | |
| 17 | Infinity | 0.000 | | | | | | | | |

| Surf | c (1/Radius) | K | A4 | A6 | A8 |
|---|---|---|---|---|---|
| 3 | −5.61610E−02 | 0.00000E+00 | 3.60936E−02 | −5.99090E−03 | 2.21927E−04 |
| 4 | 6.51738E−01 | −4.66402E−01 | 5.00065E−02 | 6.04932E−02 | −3.50474E−02 |
| 5 | −5.70487E−02 | 0.00000E+00 | −3.53407E−02 | 2.08968E−02 | −1.44401E−02 |
| 6 | −5.13307E−01 | 0.00000E+00 | 2.09869E−02 | 3.19045E−03 | −1.01598E−02 |
| 10 | −2.64927E−01 | 0.00000E+00 | 7.66279E−02 | −1.53653E−02 | 1.41002E−01 |
| 11 | 8.54701E−01 | −5.24874E+00 | 1.01465E+00 | −1.40278E+00 | 1.39243E+00 |
| 12 | −5.09809E−01 | −1.20630E+00 | 2.28623E−02 | −3.26880E−02 | 3.86973E−02 |

| Surf | A10 | A12 | A14 | A16 |
|---|---|---|---|---|
| 3 | 3.66687E−05 | −4.60173E−06 | 0.00000E+00 | 0.00000E+00 |
| 4 | 3.14135E−02 | −1.09696E−02 | 0.00000E+00 | 0.00000E+00 |
| 5 | −7.06547E−04 | 1.64926E−03 | 0.00000E+00 | 0.00000E+00 |
| 6 | 5.85313E−03 | −4.48093E−04 | 0.00000E+00 | 0.00000E+00 |
| 10 | −7.70197E−02 | 1.91731E−02 | 0.00000E+00 | 0.00000E+00 |
| 11 | −1.17816E+00 | 8.25485E−01 | −3.74792E−01 | 7.37548E−02 |
| 12 | −1.89499E−02 | 4.11829E−03 | 0.00000E+00 | 0.00000E+00 |

As shown in Table 2 and Table 3, the sag amount Sag12 and the diameter D12 of the lens surface 102 of the first lens 10 are 1.555 mm and 4.801 mm, respectively. Therefore, the ratio (Sag12/(D12/2)) is 0.648, which satisfies the conditional expression (1).

The sag amount Sag21 and the diameter D21 of the lens surface 21 of the second lens 20 are 0.199 mm and 4.801 mm, respectively. Therefore, the absolute value of the ratio (Sag21/(D21/2)) is 0.083, which satisfies the conditional expression (2).

The sag amount Sag31 and the diameter D31 of the lens surface 31 of the third lens 30 are −0.098 mm and 2.362 mm, respectively. Therefore, the absolute value of the ratio (Sag31/(D31/2)) is 0.083, which satisfies the conditional expression (3).

The sag amount Sag22 and the diameter D22 of the lens surface 22 of the second lens 20 are 0.842 mm and 2.501 mm, respectively. Therefore, the ratio (Sag22/(D22/2)) is 0.674, which satisfies the conditional expression (4).

The composite focal lengths f12 and f3456 are −1.283 mm and 2.360 mm, respectively. Therefore, the absolute value of the ratio f12/f3456 is 0.544, which satisfies the condition (5).

The composite focal length f12 and the focal length f0 of the entire lens system are −1.283 mm and 0.914 mm, respectively. Therefore, the absolute value of the ratio f12/f0 is 1.405, which satisfies the conditional expression (6).

The composite focal length f456 and the focal length f0 of the entire lens system are 3.029 mm and 0.914 mm, respectively. Therefore, the ratio f456/f0 is 3.316, which satisfies the conditional expression (7).

The focal length f0 of the entire lens system and the total length d0 are 0.914 mm and 12.301 mm, respectively. Therefore, the ratio d0/f0 is 13.463, which satisfies the conditional expression (8).

The refractive index Nd (n1) of the first lens 10 is 1.876, which satisfies the conditional expression (9).

In the wide-angle lens 100 thus configured, similarly to the first embodiment, the anti-reflection layer 18 having the reflectance characteristic indicated by the solid line L1 in FIG. 5 is formed on the lens surface 102 of the first lens 10.

Second Embodiment

Figure 6:
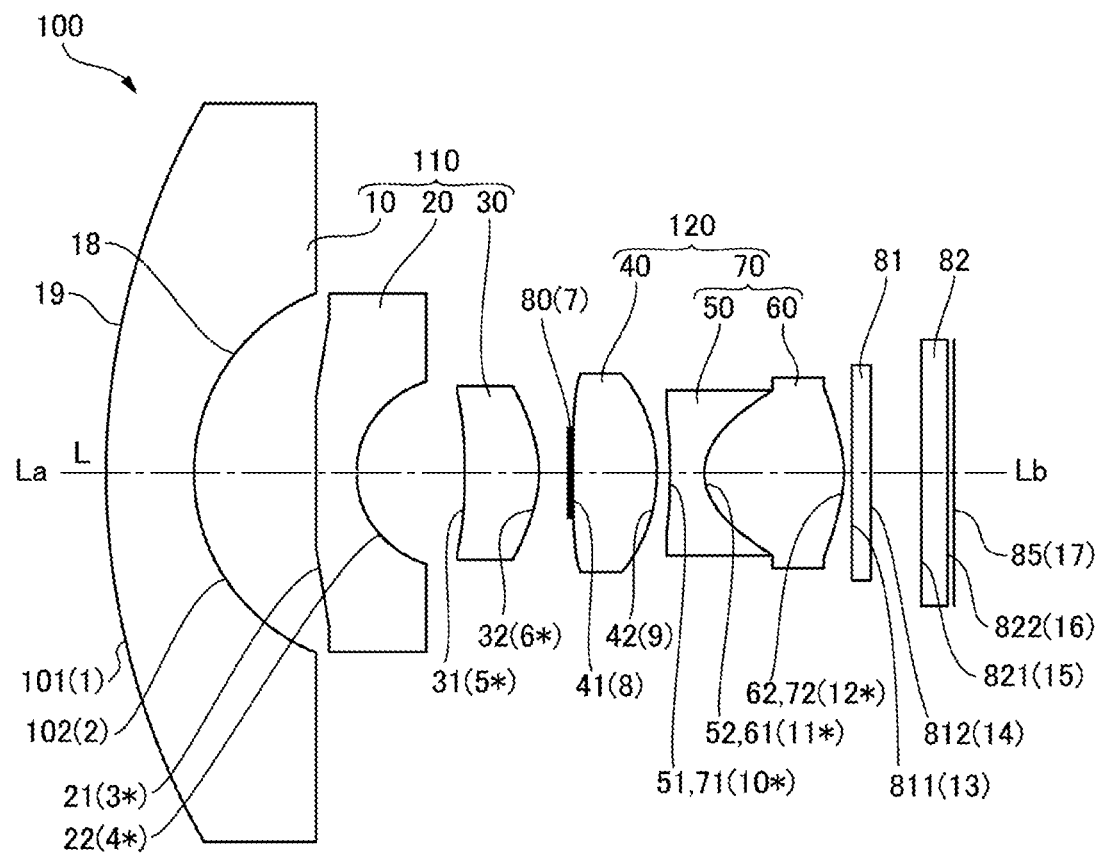
FIG. 6 is an explanatory diagram of a wide-angle lens according to a second embodiment of the present invention.
Figure 7:
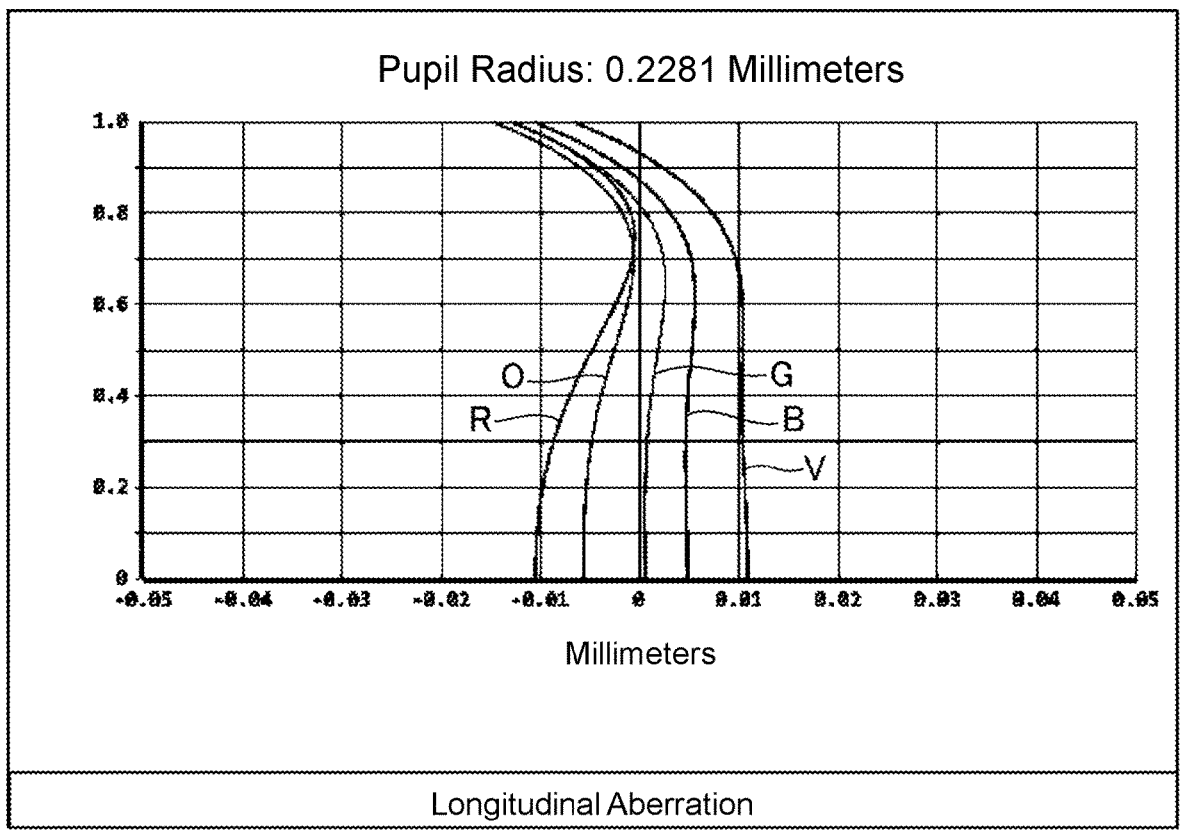
FIG. 7 is a graphical representation for explaining a spherical aberration of the wide-angle lens illustrated in FIG. 6.
Figure 8:
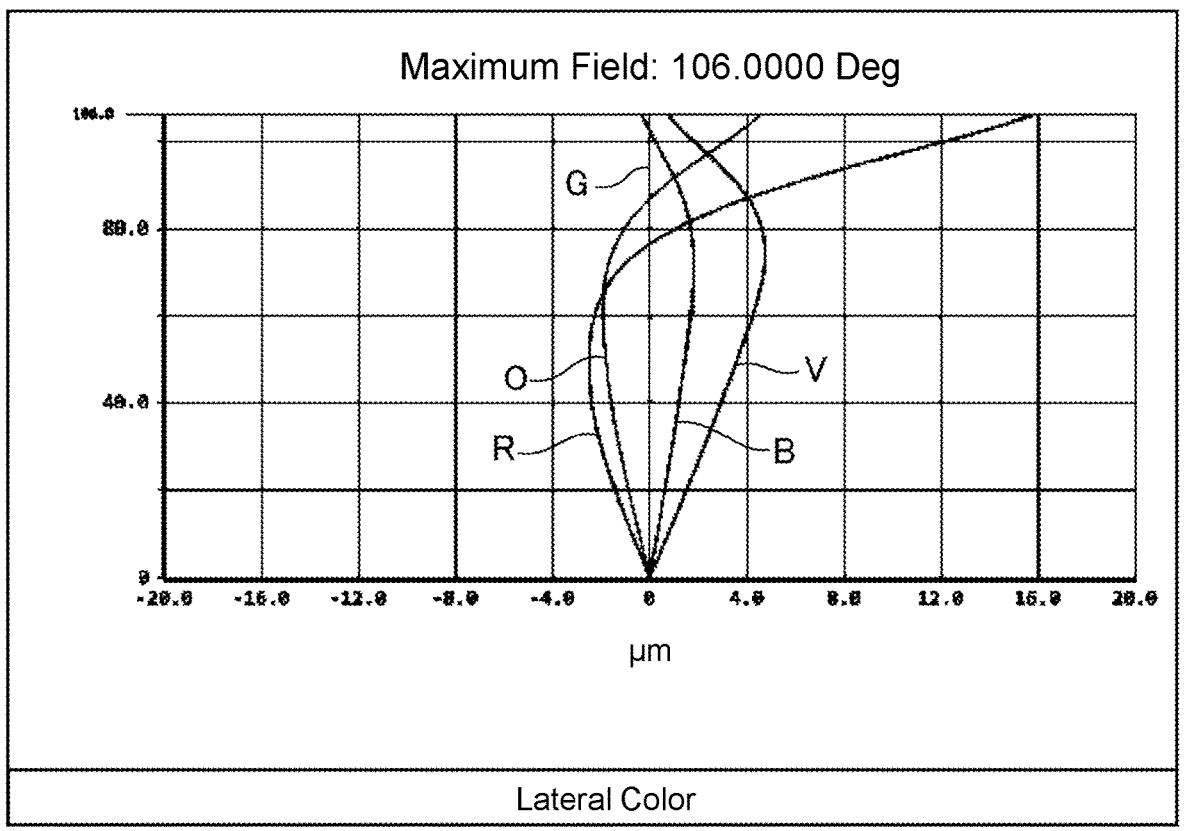
FIG. 8 is a graphical representation for explaining a chromatic aberration of magnification of the wide-angle lens illustrated in FIG. 6.
Figure 9:
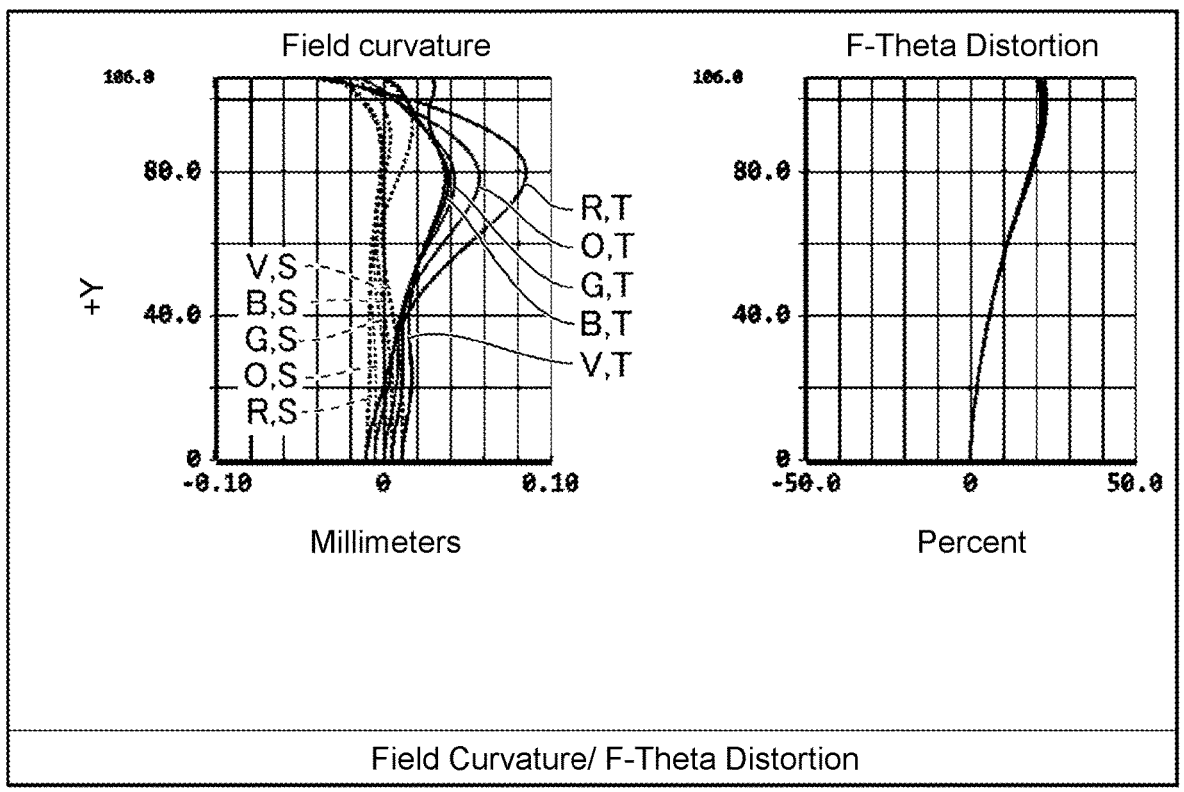
FIG. 9 is a graphical representation for explaining an astigmatism and a distortion of the wide-angle lens illustrated in FIG. 6.

FIG. 6 is an explanatory diagram of the wide-angle lens 100 according to a second embodiment of the present invention. FIG. 7 is a graphical representation for explaining a spherical aberration of the wide-angle lens 100 illustrated in FIG. 6. FIG. 8 is a graphical representation for explaining a chromatic aberration of magnification of the wide-angle lens 100 illustrated in FIG. 6, and shows the chromatic aberration of magnification at the maximum field angle (106.0000 deg/half). FIG. 9 is a graphical representation for explaining an astigmatism and a distortion of the wide-angle lens 100 illustrated in FIG. 6.

As illustrated in FIG. 6, similarly to the first embodiment, the wide-angle lens 100 according to the present embodiment also includes the front group 110, the aperture 80, the rear group 120, and the infrared cut filter 81 arranged in order from the object side La to the image side Lb. The front group 110 includes the first lens 10, the second lens 20, and the third lens 30 arranged from the side La closest to the object to the image side Lb. The rear group 120 includes the fourth lens 40, the fifth lens 50, and the sixth lens 60 arranged from the object side La to the image side Lb. In the present embodiment, the lens surface 21 (the third surface 3) of the second lens 20 at the object side La is a convex curved surface. Other basic configurations are similar to those in the first embodiment.

A configuration, etc. of each of the lenses of the wide-angle lens 100 according to the present embodiment are as shown in Table 4. In the wide-angle lens 100 according to the present embodiment, the focal length f0 of the entire lens system is 0.913 mm, the total length being the distance from the lens surface 101 of the first lens 10 to the image pickup element 85 is 12.450 mm, the F value of the entire lens system is 2.0, and the maximum field angle is 212 deg. As shown in FIG. 7 through FIG. 9, in the wide-angle lens 100 according to the present embodiment, the spherical aberration, the chromatic aberration of magnification, and the astigmatism (distortion) are corrected to an appropriate level.

TABLE 4

| Effective Focal Length f0 | 0.913 mm |
| Total Track d0 | 12.450 mm |
| Image Space F/# | 2.0 |
| Max. Field of Angle | 212 deg |

| Surf | Radius | Thickness | Nd | v d | Diameter | Sag | f | f | f | f |
|---|---|---|---|---|---|---|---|---|---|---|
| 1 | 11.290 | 1.300 | 1.876 | 40.5 | 11.076 | 1.452 | −4.941 | −1.393 | 19.693 | |
| 2 | 2.960 | 1.767 | | | 5.392 | 1.738 | | | | |
| 3* | 182.590 | 0.600 | 1.546 | 56.2 | 5.392 | 0.161 | −2.682 | | | |
| 4* | 1.452 | 1.589 | | | 2.787 | 1.001 | | | | |
| 5* | −7.546 | 1.090 | 1.641 | 23.9 | 2.665 | −0.120 | 4.070 | | | 2.461 |
| 6* | −2.049 | 0.434 | | | 2.519 | −0.362 | | | | |
| 7(stop) | Infinity | 0.060 | | | | | | | | |
| 8 | 12.690 | 1.240 | 1.700 | 55.3 | 3.000 | 0.089 | 3.037 | | 2.889 | |
| 9 | −2.450 | 0.190 | | | 3.000 | −0.513 | | | | |
| 10* | −13.688 | 0.500 | 1.641 | 23.9 | 2.142 | −0.045 | −1.509 | 6.121 | | |
| 11* | 1.056 | 2.062 | 1.546 | 56.2 | 2.534 | 0.992 | 1.680 | | | |
| 12* | −2.172 | 0.100 | | | 2.916 | −0.325 | | | | |
| 13 | Infinity | 0.300 | | | 3.179 | | | | | |
| 14 | Infinity | 0.748 | | | 3.306 | | | | | |
| 15 | Infinity | 0.400 | | | 3.813 | | | | | |
| 16 | Infinity | 0.070 | | | 4.058 | | | | | |
| 17 | Infinity | 0.000 | | | | | | | | |

| Surf | c (1/Radius) | K | A4 | A6 | A8 |
|---|---|---|---|---|---|
| 3 | 5.47675E−03 | 0.00000E+00 | 1.79452E−02 | −3.36621E−03 | 2.78528E−04 |
| 4 | 6.88805E−01 | −3.58100E−02 | −1.40813E−02 | 4.02374E−02 | −3.36600E−02 |
| 5 | −1.32519E−01 | 0.00000E+00 | −3.10973E−02 | 1.44718E−02 | −5.68787E−05 |
| 6 | −4.88157E−01 | 0.00000E+00 | 1.31783E−02 | 2.13002E−02 | −2.00330E−02 |
| 11 | −1.36877E+01 | 0.00000E+00 | 1.16057E−02 | −1.17378E−02 | −5.07309E−03 |

TABLE 4-continued

| 12 | 1.05594E+00 | −6.23310E−01 | 2.18008E−01 | −2.11743E−01 | 7.27627E−02 |
| 13 | −2.17187E+00 | −1.13772E+01 | −6.70142E−02 | 5.01093E−02 | −1.52055E−02 |

| Surf | A10 | A12 | A14 | A16 |
|---|---|---|---|---|
| 3 | −1.42651E−05 | 1.62590E−07 | −2.47672E−08 | 0.00000E+00 |
| 4 | 1.37146E−02 | −2.23352E−03 | −2.21899E−04 | 0.00000E+00 |
| 5 | −4.39605E−04 | 6.66143E−04 | 5.48408E−05 | 0.00000E+00 |
| 6 | 1.21411E−02 | −3.19024E−03 | 3.39040E−04 | 0.00000E+00 |
| 11 | 4.73064E−03 | −8.45829E−05 | −3.73174E−04 | 0.00000E+00 |
| 12 | −1.31281E−03 | 1.65751E−03 | −3.59862E−03 | 0.00000E+00 |
| 13 | 2.03886E−03 | 1.64055E−04 | −3.72385E−05 | 0.00000E+00 |

As shown in Table 2 and Table 4, the sag amount Sag12 and the diameter D12 of the lens surface 102 of the first lens 10 are 1.738 mm and 5.392 mm, respectively. Therefore, the ratio (Sag12/(D12/2)) is 0.645, which satisfies the conditional expression (1).

The sag amount Sag21 and the diameter D21 of the lens surface 21 of the second lens 20 are 0.161 mm and 5.392 mm, respectively. Therefore, the absolute value of the ratio (Sag21/(D21/2)) is 0.060, which satisfies the conditional expression (2).

The sag amount Sag31 and the diameter D31 of the lens surface 31 of the third lens 30 are −0.120 mm and 2.665 mm, respectively. Therefore, the absolute value of the ratio (Sag31/(D31/2)) is 0.090, which satisfies the conditional expression (3).

The sag amount Sag22 and the diameter D22 of the lens surface 22 of the second lens 20 are 1.001 mm and 2.787 mm, respectively. Therefore, the ratio (Sag22/(D22/2)) is 0.718, which satisfies the conditional expression (4).

The composite focal lengths f12 and f3456 are −1.393 mm and 2.461 mm, respectively. Therefore, the absolute value of the ratio f12/f3456 is 0.567, which satisfies the condition (5).

The composite focal length f12 and the focal length f0 of the entire lens system are −1.393 mm and 0.913 mm, respectively. Therefore, the absolute value of the ratio f12/f0 is 1.53, which satisfies the conditional expression (6).

The composite focal length f456 and the focal length f0 of the entire lens system are 2.889 mm and 0.913 mm, respectively. Therefore, the ratio f456/f0 is 3.16, which satisfies the conditional expression (7).

The focal length f0 of the entire lens system and the total length d0 are 0.913 mm and 12.450 mm, respectively. Therefore, the ratio d0/f0 is 13.64, which satisfies the conditional expression (8).

The refractive index Nd (n1) of the first lens 10 is 1.876, which satisfies the conditional expression (9).

In the wide-angle lens 100 thus configured, similarly to the first embodiment, the anti-reflection layer 18 having the reflectance characteristic indicated by the solid line L1 in FIG. 5 is formed on the lens surface 102 of the first lens 10.

Third Embodiment

Figure 10:
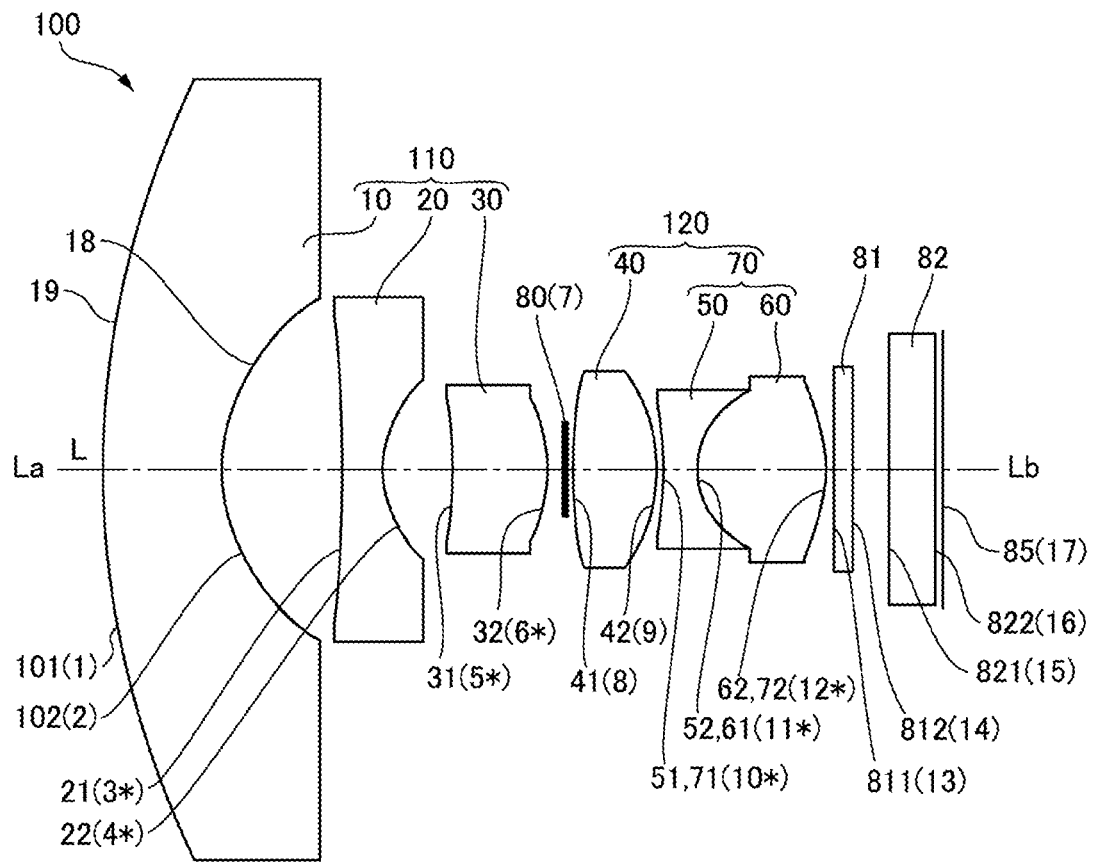
FIG. 10 is an explanatory diagram of a wide-angle lens according to a third embodiment of the present invention.
Figure 11:
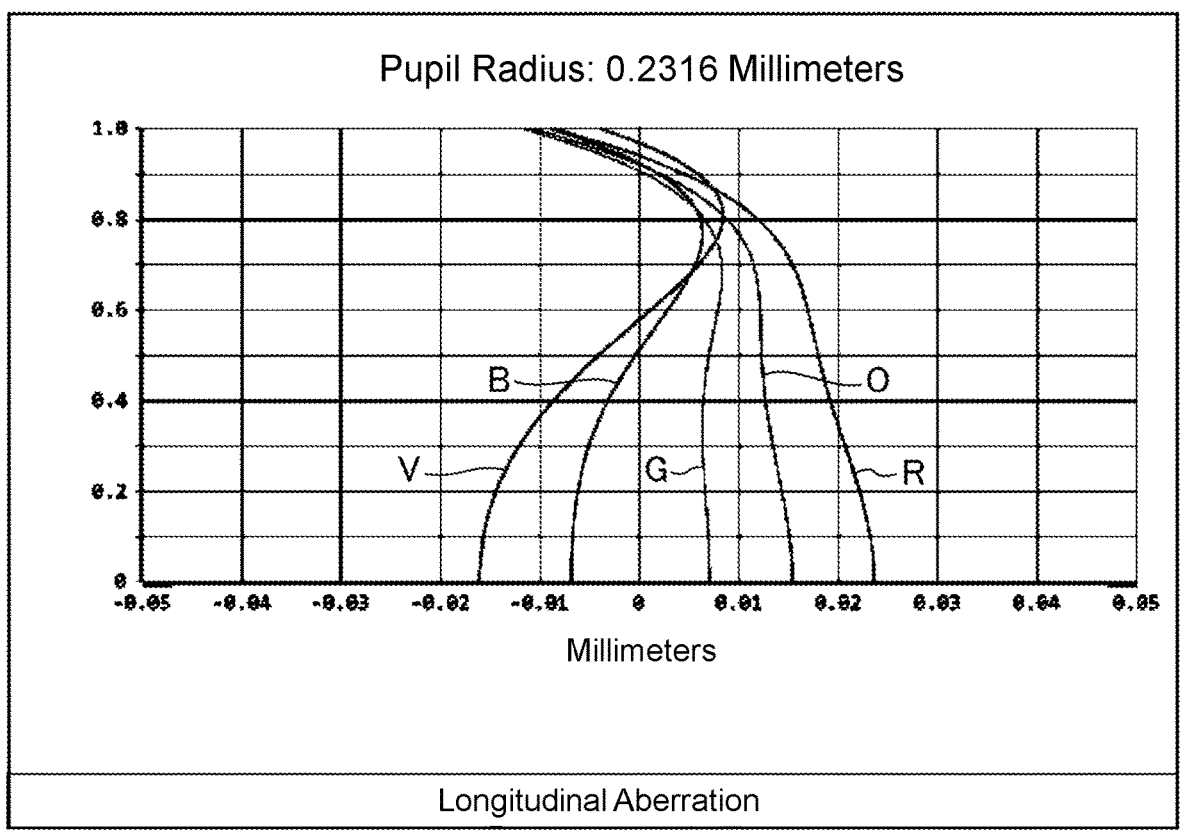
FIG. 11 is a graphical representation for explaining a spherical aberration of the wide-angle lens illustrated in FIG. 10.
Figure 12:
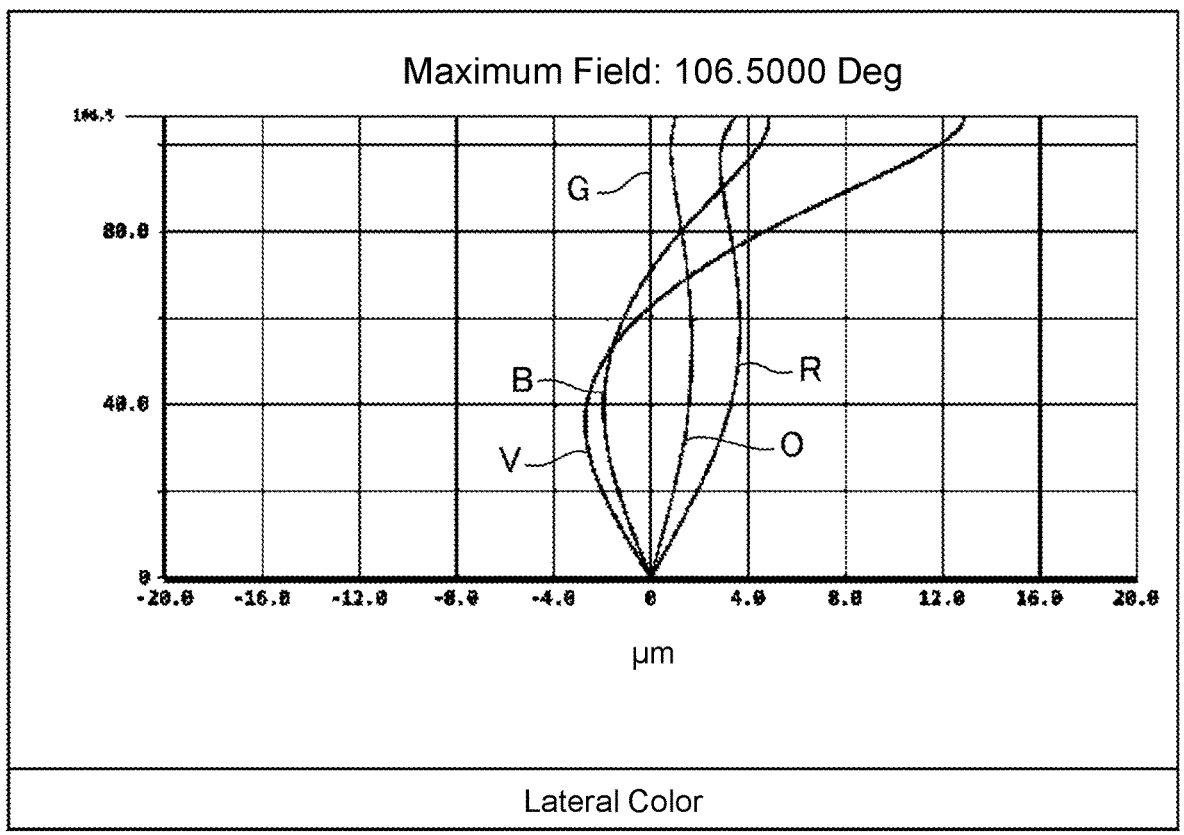
FIG. 12 is a graphical representation for explaining a chromatic aberration of magnification of the wide-angle lens illustrated in FIG. 10.
Figure 13:
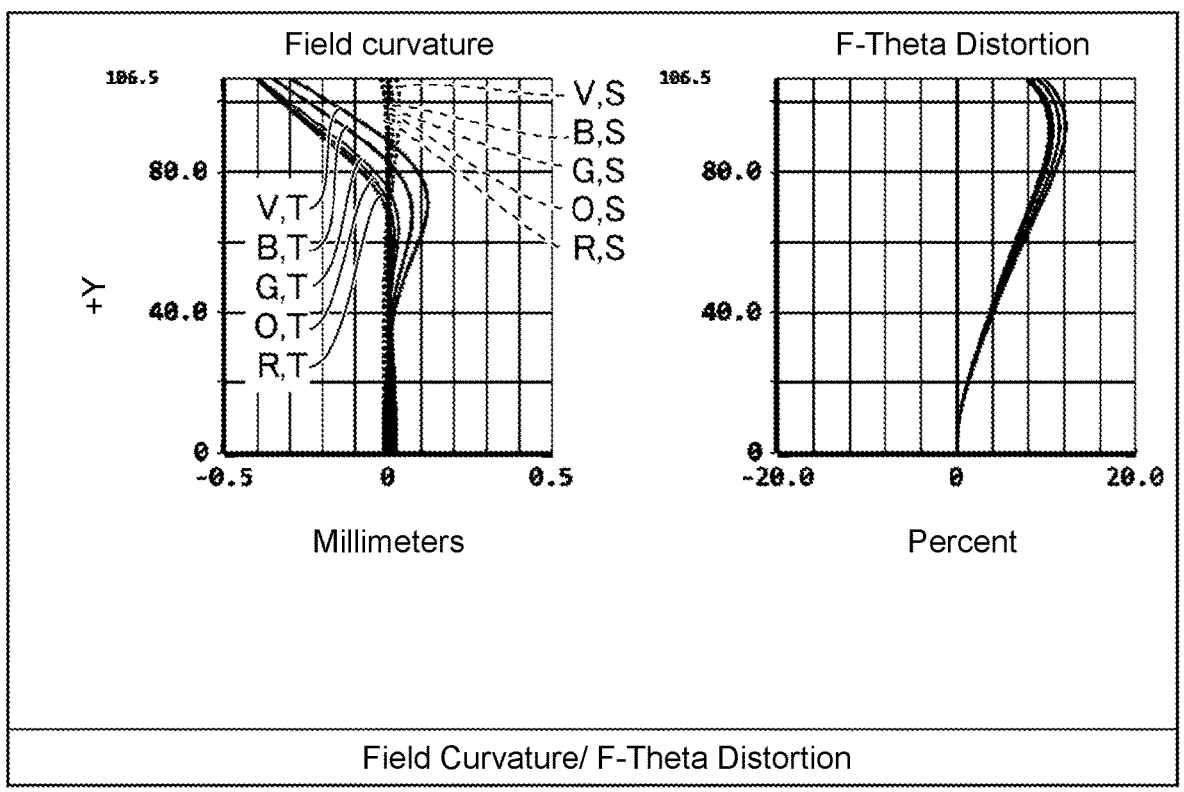
FIG. 13 is a graphical representation for explaining an astigmatism and a distortion of the wide-angle lens illustrated in FIG. 10.

FIG. 10 is an explanatory diagram of the wide-angle lens 100 according to a third embodiment of the present invention. FIG. 11 is a graphical representation for explaining a spherical aberration of the wide-angle lens 100 illustrated in FIG. 10. FIG. 12 is a graphical representation for explaining a chromatic aberration of magnification of the wide-angle lens 100 illustrated in FIG. 10, and shows the chromatic aberration of magnification at the maximum field angle (106.5000 deg/half). FIG. 13 is a graphical representation for explaining an astigmatism and a distortion of the wide-angle lens 100 illustrated in FIG. 10.

As illustrated in FIG. 10, similarly to the first embodiment, the wide-angle lens 100 according to the present embodiment also includes the front group 110, the aperture 80, the rear group 120, and the infrared cut filter 81 arranged in order from the object side La to the image side Lb. The front group 110 includes the first lens 10, the second lens 20, and the third lens 30 arranged from the side La closest to the object to the image side Lb. The rear group 120 has a basic configuration similar to that of the first embodiment, and includes the fourth lens 40, the fifth lens 50, and the sixth lens 60 arranged from the object side La to the image side Lb.

A configuration, etc. of each of the lenses of the wide-angle lens 100 according to the present embodiment are as shown in Table 5. In the wide-angle lens 100 according to the present embodiment, the focal length f0 of the entire lens system is 0.945 mm, the total length being the distance from the lens surface 101 of the first lens 10 to the image pickup element 85 is 12.393 mm, the F value of the entire lens system is 2.04, and the maximum field angle is 213 deg. As shown in FIG. 11 through FIG. 13, in the wide-angle lens 100 according to the present embodiment, the spherical aberration, the chromatic aberration of magnification, and the astigmatism (distortion) are corrected to an appropriate level.

TABLE 5

| Effective Focal Length f0 | 0.945 mm |
| Total Track d0 | 12.393 mm |
| Image Space F/# | 2.04 |
| Max. Field of Angle | 213 deg |

| Surf | Radius | Thickness | Nd | v d | Diameter | Sag | f | f | f | f |
|---|---|---|---|---|---|---|---|---|---|---|
| 1 | 11.875 | 1.743 | 1.876 | 40.5 | 10.996 | 1.349 | −4.490 | −1.319 | 14.400 | |
| 2 | 2.752 | 1.773 | | | 4.837 | 1.439 | | | | |
| 3* | −23.346 | 0.600 | 1.546 | 56.2 | 4.837 | −0.124 | −2.626 | | | |
| 4* | 1.542 | 1.033 | | | 2.586 | 0.600 | | | | |
| 5* | −12.117 | 1.412 | 1.641 | 23.9 | 2.387 | −0.110 | 3.563 | | | 2.374 |

TABLE 5-continued

| | | | | | | | | |
|---|---|---|---|---|---|---|---|---|
| 6* | −2.010 | 0.248 | | | 2.060 | −0.255 | | |
| 7(stop) | Infinity | 0.129 | | | | | | |
| 8 | 6.667 | 1.240 | 1.700 | 55.3 | 2.800 | 0.149 | 2.681 | 2.832 |
| 9 | −2.411 | 0.104 | | | 2.800 | −0.448 | | |
| 10* | −4.190 | 0.500 | 1.641 | 23.9 | 1.989 | −0.101 | −1.631 | 6.270 |
| 11* | 1.458 | 1.912 | 1.546 | 56.2 | 2.307 | 0.771 | 1.889 | |
| 12* | −1.894 | 0.050 | | | 2.662 | −0.329 | | |
| 13 | Infinity | 0.880 | | | 2.894 | | | |
| 14 | Infinity | 0.700 | | | 3.431 | | | |
| 15 | Infinity | 0.070 | | | 3.849 | | | |
| 16 | Infinity | 0.000 | | | | | | |
| 17 | Infinity | 0.000 | | | | | | |

| Surf | c (1/Radius) | K | A4 | A6 | A8 |
|---|---|---|---|---|---|
| 3 | −4.28339E−02 | 0.00000E+00 | 0.00000E+00 | 7.72251E−06 | 0.00000E+00 |
| 4 | 6.48429E−01 | −1.50814E+00 | 8.84010E−03 | 4.00497E−02 | −2.16892E−02 |
| 5 | −8.25261E−02 | 0.00000E+00 | −3.50614E−02 | 1.56806E−02 | −2.75038E−02 |
| 6 | −4.97570E−01 | 0.00000E+00 | 1.88613E−02 | 1.76225E−02 | −2.11391E−02 |
| 11 | −2.38683E−01 | 0.00000E+00 | 6.99611E−02 | −1.13182E−01 | 1.05786E−01 |
| 12 | 6.85730E−01 | 7.32395E−02 | 6.05300E−01 | −8.02068E−01 | 5.06018E−01 |
| 13 | −5.27877E−01 | −1.27120E+00 | 3.32290E−02 | −2.77814E−02 | 3.50790E−02 |

| Surf | A10 | A12 | A14 | A16 |
|---|---|---|---|---|
| 3 | 0.00000E+00 | 0.00000E+00 | 0.00000E+00 | 0.00000E+00 |
| 4 | −5.36846E−03 | 5.82333E−03 | 0.00000E+00 | 0.00000E+00 |
| 5 | 1.45123E−02 | 3.29581E−04 | 0.00000E+00 | 0.00000E+00 |
| 6 | −2.26131E−03 | 1.12143E−02 | 0.00000E+00 | 0.00000E+00 |
| 11 | −6.36463E−02 | 1.95813E−02 | 0.00000E+00 | 0.00000E+00 |
| 12 | −1.54055E−01 | 1.16737E−02 | 0.00000E+00 | 0.00000E+00 |
| 13 | −1.67370E−02 | 3.88748E−03 | 0.00000E+00 | 0.00000E+00 |

As shown in Table 2 and Table 5, the sag amount Sag12 and the diameter D12 of the lens surface 102 of the first lens 10 are 1.439 mm and 4.837 mm, respectively. Therefore, the ratio (Sag12/(D12/2)) is 0.595, which satisfies the conditional expression (1).

The sag amount Sag21 and the diameter D21 of the lens surface 21 of the second lens 20 are −0.124 mm and 4.837 mm, respectively. Therefore, the absolute value of the ratio (Sag21/(D21/2)) is 0.051, which satisfies the conditional expression (2).

The sag amount Sag31 and the diameter D31 of the lens surface 31 of the third lens 30 are −0.110 mm and 2.387 mm, respectively. Therefore, the absolute value of the ratio (Sag31/(D31/2)) is 0.092, which satisfies the conditional expression (3).

The sag amount Sag22 and the diameter D22 of the lens surface 22 of the second lens 20 are 0.600 mm and 2.586 mm, respectively. Therefore, the ratio (Sag22/(D22/2)) is 0.464, which satisfies the conditional expression (4).

The composite focal lengths f12 and f3456 are −1.319 mm and 2.374 mm, respectively. Therefore, the absolute value of the ratio f12/f3456 is 0.556, which satisfies the condition (5).

The composite focal length f12 and the f0 of the entire lens system are −1.319 mm and 0.945 mm, respectively. Therefore, the absolute value of the ratio f12/f0 is 1.40, which satisfies the conditional expression (6).

The composite focal length f456 and the focal length f0 of the entire lens system are 2.832 mm and 0.945 mm, respectively. Therefore, the ratio f456/f0 is 3.00, which satisfies the conditional expression (7).

The focal length f0 of the entire lens system and the total length d0 are 0.945 mm and 12.393 mm, respectively. Therefore, the ratio d0/f0 is 13.12, which satisfies the conditional expression (8).

The refractive index Nd (n1) of the first lens 10 is 1.876, which satisfies the conditional expression (9).

In the wide-angle lens 100 thus configured, similarly to the first embodiment, the anti-reflection layer 18 having the reflectance characteristic indicated by the solid line L1 in FIG. 5 is formed on the lens surface 102 of the first lens 10.

Other Embodiments

In the above-described embodiments, the first lens 10 is a glass lens, but may be a plastic lens. In this case, the lens surface 102 of the first lens 10 on the image side Lb may be aspheric.

INDUSTRIAL APPLICABILITY

In the present invention, an absolute value of a ratio (Sag31/(D31/2)) of the sag amount Sag31 of the lens surface of the third lens on the object side to a radius (D31/2) of the lens surface of the third lens on the object side exceeds the lower limit (0) because of which the lens surface of the third lens on the object side is not flat. Therefore, it is possible to properly correct various aberrations. An upper limit (0.125) is set to the absolute value of the ratio (Sag31/(D31/2)) because of which it is possible to avoid concave surfaces having a large sag amount from facing to each other between the second lens and the third lens. Therefore, multiple reflection between the concave surfaces having a large sag amount can be suppressed between the second lens and the third lens, and as a result, it is possible to suppress an occurrence of a spot-like ghost due to multiple reflection between the lens surface of the second lens on the image side and the lens surface of the third lens on the object side.

The invention claimed is:

1. A wide-angle lens, comprising: a front group; an aperture; and a rear group arranged in order from an object side to an image side, wherein in the front group, at least a first lens, a second lens, and a third lens are arranged in order from a side closest to the object side to the image side, the first lens is a negative meniscus lens of which a lens surface on the image side is a concave curved surface, the second lens is a negative lens of which a lens surface on the image side is a concave curved surface, the third lens is a positive lens of which a lens surface on the image side is a convex curved surface, and when a sag amount of a lens surface of the third lens on the object side is Sag31 (mm), and a diameter of the lens surface of the third lens on the object side is D31 (mm), the sag amount Sag31 and the diameter D31 satisfy the following conditional expression:

$$0<|Sag31/(D31/2)|<0.125,$$

and when a sag amount of the lens surface of the second lens on the image side is Sag22 (mm), and a diameter of the lens surface of the second lens on the image side is D22 (mm), the sag amount Sag22 and the diameter D22 satisfy the following conditional expression:

$$0.400<Sag22/(D22/2)<1.733.$$

2. The wide-angle lens according to claim 1, wherein when a sag amount of a lens surface of the second lens on the object side is Sag21 (mm), and a diameter of the lens surface of the second lens on the object side is D21 (mm), the sag amount Sag21 and the diameter D21 satisfy the following conditional expression:

$$0<|Sag21/(D21/2)|<0.125.$$

3. The wide-angle lens according to claim 2, wherein an anti-reflection layer is provided on at least the lens surface of the first lens on the image side.

4. The wide-angle lens according to claim 3, wherein an anti-reflection layer having a reflectance of 1.5% or less in a wavelength range from 430 nm to 850 nm is provided on the lens surface of the first lens on the image side as the anti-reflection layer.

5. The wide-angle lens according to claim 3, wherein when a sag amount of the lens surface of the first lens on the image side is Sag12 (mm), and a diameter of the lens surface of the first lens on the image side is D12 (mm), the sag amount Sag12 and the diameter D12 satisfy the following conditional expression:

$$0.577<Sag12/(D12/2)<1.733.$$

6. The wide-angle lens according to claim 1, wherein the front group includes the first lens, the second lens, and the third lens arranged in order from the object side to the image side, the rear group includes a fourth lens, a fifth lens, and a sixth lens arranged in order from the object side to the image side, the fourth lens is a positive lens of which a lens surface on the image side is a convex curved surface, the fifth lens is a negative lens of which a lens surface on the image side is a concave curved surface, the sixth lens is a biconvex lens of which a lens surface on the object side and a lens surface on the image side are convex curved surfaces, the second lens, the third lens, the fifth lens, and the sixth lens are plastic lenses, the fourth lens is a glass lens, and the fifth lens and the sixth lens configure a cemented lens in which the lens surface of the fifth lens on the image side and the lens surface of the sixth lens on the object side are cemented.

7. The wide-angle lens according to claim 6, wherein when a sag amount of a lens surface of the second lens on the object side is Sag21 (mm), and a diameter of the lens surface of the second lens on the object side is D21 (mm), the sag amount Sag21 and the diameter D21 satisfy the following conditional expression:

$$0<|Sag21/(D21/2)|<0.125.$$

8. The wide-angle lens according to claim 7, wherein an anti-reflection layer is provided on at least a lens surface of the first lens on the image side.

9. The wide-angle lens according to claim 8, wherein an anti-reflection layer having a reflectance of 1.5% or less in a wavelength range from 430 nm to 850 nm is provided on the lens surface of the first lens on the image side as the anti-reflection layer.

10. The wide-angle lens according to claim 8, wherein when a sag amount of the lens surface of the first lens on the image side is Sag12 (mm), and a diameter of the lens surface of the first lens on the image side is D12 (mm), the sag amount Sag12 and the diameter D12 satisfy the following conditional expression:

$$0.577<Sag12/(D12/2)<1.733.$$

* * * * *